US012149016B2

(12) United States Patent
Hou et al.

(10) Patent No.: US 12,149,016 B2
(45) Date of Patent: Nov. 19, 2024

(54) LOW CROSSTALK CARD EDGE CONNECTOR

(71) Applicant: Amphenol FCI Asia Pte. Ltd., Singapore (SG)

(72) Inventors: Yaohua Hou, Chengdu (CN); Qiaoli Chen, Singapore (SG); Peng Huang, Chengdu (CN); Zhineng Fan, Volente, TX (US); Luyun Yi, Chengdu (CN)

(73) Assignee: Amphenol FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 18/336,825

(22) Filed: Jun. 16, 2023

(65) Prior Publication Data

US 2024/0030636 A1 Jan. 25, 2024

Related U.S. Application Data

(63) Continuation of application No. 16/760,400, filed as application No. PCT/CN2017/108344 on Oct. 30, 2017, now Pat. No. 11,710,917.

(51) Int. Cl.

| | |
|---|---|
| ***H01R 12/73*** | (2011.01) |
| ***H01R 13/405*** | (2006.01) |
| ***H01R 13/6461*** | (2011.01) |
| ***H01R 13/6477*** | (2011.01) |

(52) U.S. Cl.
CPC ......... *H01R 12/737* (2013.01); *H01R 13/405* (2013.01); *H01R 13/6461* (2013.01); *H01R 13/6477* (2013.01)

(58) Field of Classification Search
CPC ......................... H01R 23/7068; H01R 23/725; H01R 12/737; H01R 13/405; H01R 13/6461; H01R 13/6477
USPC .................................................. 439/637, 108
See application file for complete search history.

(56) References Cited

U.S. PATENT DOCUMENTS

| | | | |
|---|---|---|---|
| 3,530,422 | A | 9/1970 | Goodman |
| 4,286,837 | A | 9/1981 | Yasutake et al. |
| 5,041,023 | A | 8/1991 | Lytle |
| 6,296,491 | B1 | 10/2001 | Pickles |

(Continued)

FOREIGN PATENT DOCUMENTS

| | | | |
|---|---|---|---|
| CN | 1161860 | C | 8/2004 |
| CN | 1996678 | A | 7/2007 |

(Continued)

OTHER PUBLICATIONS

U.S. Appl. No. 17/089,905, filed Nov. 5, 2020, Jiang.

(Continued)

*Primary Examiner* — Gary F Paumen
(74) *Attorney, Agent, or Firm* — Wolf, Greenfield & Sacks, P.C.

(57) ABSTRACT

An electrical connector includes a first set of conductors, a first overmolding in physical contact with a body portion of each of the first set of conductors, a second set of conductors, a second overmolding in physical contact with the body portion of each of the second set of conductors, and a spacer in contact with the first overmolding and the second overmolding. A gap is present between the spacer and at least one of the first set of conductors and a gap between the spacer and at least one of the second set of conductors.

20 Claims, 22 Drawing Sheets

(56) References Cited

U.S. PATENT DOCUMENTS

| | | | |
|---|---|---|---|
| 6,315,615 B1 | 11/2001 | Raistrick | |
| 7,467,977 B1 | 12/2008 | Yi et al. | |
| 7,473,124 B1 | 1/2009 | Briant et al. | |
| 7,494,383 B2 | 2/2009 | Cohen et al. | |
| 7,540,781 B2 | 6/2009 | Kenny et al. | |
| 7,581,990 B2 | 9/2009 | Kirk et al. | |
| 7,588,464 B2 | 9/2009 | Kim | |
| 7,604,502 B2 | 10/2009 | Pan | |
| 7,645,165 B2 | 1/2010 | Wu et al. | |
| 7,690,946 B2 | 4/2010 | Knaub et al. | |
| 7,699,644 B2 | 4/2010 | Szczesny et al. | |
| 7,722,401 B2 | 5/2010 | Kirk et al. | |
| 7,727,027 B2 | 6/2010 | Chiang et al. | |
| 7,727,028 B1 | 6/2010 | Zhang et al. | |
| 7,731,537 B2 | 6/2010 | Amleshi et al. | |
| 7,731,541 B1 | 6/2010 | Lee et al. | |
| 7,753,731 B2 | 7/2010 | Cohen et al. | |
| 7,771,233 B2 | 8/2010 | Gailus | |
| 7,789,676 B2 | 9/2010 | Morgan et al. | |
| 7,794,240 B2 | 9/2010 | Cohen et al. | |
| 7,794,278 B2 | 9/2010 | Cohen et al. | |
| 7,806,729 B2 | 10/2010 | Nguyen et al. | |
| 7,824,192 B2 | 11/2010 | Lin et al. | |
| 7,871,296 B2 | 1/2011 | Fowler et al. | |
| 7,874,873 B2 | 1/2011 | Do et al. | |
| 7,883,369 B1 | 2/2011 | Sun et al. | |
| 7,887,371 B2 | 2/2011 | Kenny et al. | |
| 7,887,379 B2 | 2/2011 | Kirk | |
| 7,906,730 B2 | 3/2011 | Atkinson et al. | |
| 7,914,304 B2 | 3/2011 | Cartier et al. | |
| 7,946,889 B2 | 5/2011 | Mizumura | |
| 7,985,097 B2 | 7/2011 | Gulla | |
| 7,993,147 B2 | 8/2011 | Cole et al. | |
| 8,018,733 B2 | 9/2011 | Jia | |
| 8,083,553 B2 | 12/2011 | Manter et al. | |
| 8,123,544 B2 | 2/2012 | Kobayashi | |
| 8,142,207 B1 | 3/2012 | Ljubijankic et al. | |
| 8,182,289 B2 | 5/2012 | Stokoe et al. | |
| 8,215,968 B2 | 7/2012 | Cartier et al. | |
| 8,216,001 B2 | 7/2012 | Kirk | |
| 8,262,411 B2 | 9/2012 | Kondo | |
| 8,272,877 B2 | 9/2012 | Stokoe et al. | |
| 8,337,247 B2 | 12/2012 | Zhu | |
| 8,348,701 B1 | 1/2013 | Lan et al. | |
| 8,371,875 B2 | 2/2013 | Gailus | |
| 8,382,524 B2 | 2/2013 | Khilchenko et al. | |
| 8,440,637 B2 | 5/2013 | Elmen | |
| 8,480,432 B2 | 7/2013 | Wu | |
| 8,506,319 B2 | 8/2013 | Ritter et al. | |
| 8,506,331 B2 | 8/2013 | Wu | |
| 8,545,253 B2 | 10/2013 | Amidon et al. | |
| 8,550,861 B2 | 10/2013 | Cohen et al. | |
| 8,597,051 B2 | 12/2013 | Yang et al. | |
| 8,657,627 B2 | 2/2014 | McNamara et al. | |
| 8,715,003 B2 | 5/2014 | Buck et al. | |
| 8,715,005 B2 | 5/2014 | Pan | |
| 8,740,637 B2 | 6/2014 | Wang et al. | |
| 8,764,492 B2 | 7/2014 | Chiang | |
| 8,771,016 B2 | 7/2014 | Atkinson et al. | |
| 8,864,506 B2 | 10/2014 | Little et al. | |
| 8,864,521 B2 | 10/2014 | Atkinson et al. | |
| 8,905,777 B2 | 12/2014 | Zhu et al. | |
| 8,926,377 B2 | 1/2015 | Kirk et al. | |
| 8,944,831 B2 | 2/2015 | Stoner et al. | |
| 8,968,034 B2 | 3/2015 | Hsu | |
| 8,998,642 B2 | 4/2015 | Manter et al. | |
| 9,004,942 B2 | 4/2015 | Paniagua | |
| 9,011,177 B2 | 4/2015 | Lloyd et al. | |
| 9,022,806 B2 | 5/2015 | Cartier, Jr. et al. | |
| 9,028,281 B2 | 5/2015 | Kirk et al. | |
| 9,065,230 B2 | 6/2015 | Milbrand, Jr. | |
| 9,124,009 B2 | 9/2015 | Atkinson et al. | |
| 9,166,317 B2 | 10/2015 | Briant et al. | |
| 9,219,335 B2 | 12/2015 | Atkinson et al. | |
| 9,225,085 B2 | 12/2015 | Cartier, Jr. et al. | |
| 9,246,253 B1 | 1/2016 | Defibaugh et al. | |
| 9,257,778 B2 | 2/2016 | Buck et al. | |
| 9,257,794 B2 | 2/2016 | Wanha et al. | |
| 9,263,835 B2 | 2/2016 | Guo | |
| 9,281,590 B1 | 3/2016 | Liu et al. | |
| 9,287,668 B2 | 3/2016 | Chen et al. | |
| 9,300,074 B2 | 3/2016 | Gailus | |
| 9,337,585 B1 | 5/2016 | Yang | |
| 9,350,095 B2 | 5/2016 | Arichika et al. | |
| 9,431,734 B2 | 8/2016 | Guo et al. | |
| 9,450,344 B2 | 9/2016 | Cartier, Jr. et al. | |
| 9,484,674 B2 | 11/2016 | Cartier, Jr. et al. | |
| 9,509,101 B2 | 11/2016 | Cartier, Jr. et al. | |
| 9,520,686 B2 | 12/2016 | Hu et al. | |
| 9,520,689 B2 | 12/2016 | Cartier, Jr. et al. | |
| 9,531,130 B1 | 12/2016 | Phillips et al. | |
| 9,537,250 B2 | 1/2017 | Kao et al. | |
| 9,640,915 B2 | 5/2017 | Phillips et al. | |
| 9,692,183 B2 | 6/2017 | Phillips et al. | |
| 9,742,132 B1 | 8/2017 | Hsueh | |
| 9,831,605 B2 | 11/2017 | Buck et al. | |
| 9,843,135 B2 | 12/2017 | Guetig et al. | |
| 9,887,485 B2 | 2/2018 | Lambie et al. | |
| 9,935,385 B2 | 4/2018 | Phillips et al. | |
| 9,972,945 B1 | 5/2018 | Huang et al. | |
| 9,997,853 B2 | 6/2018 | Little et al. | |
| 9,997,871 B2 | 6/2018 | Zhong et al. | |
| 10,050,369 B1 | 8/2018 | Yang | |
| 10,122,129 B2 | 11/2018 | Milbrand, Jr. et al. | |
| 10,135,197 B2 | 11/2018 | Little et al. | |
| 10,141,697 B2 | 11/2018 | Wang et al. | |
| 10,211,577 B2 | 2/2019 | Milbrand, Jr. et al. | |
| 10,243,304 B2 | 3/2019 | Kirk et al. | |
| 10,270,191 B1 | 4/2019 | Li et al. | |
| 10,276,995 B2 | 4/2019 | Little | |
| 10,283,910 B1 | 5/2019 | Chen et al. | |
| 10,320,102 B2 | 6/2019 | Phillips et al. | |
| 10,320,125 B2 | 6/2019 | Ju et al. | |
| 10,348,040 B2 | 7/2019 | Cartier, Jr. et al. | |
| 10,381,767 B1 | 8/2019 | Milbrand, Jr. et al. | |
| 10,431,936 B2 | 10/2019 | Horning et al. | |
| 10,439,311 B2 | 10/2019 | Phillips et al. | |
| 10,511,128 B2 | 12/2019 | Kirk et al. | |
| 10,541,482 B2 | 1/2020 | Sasame et al. | |
| 10,573,987 B2 | 2/2020 | Osaki et al. | |
| 10,601,181 B2 | 3/2020 | Lu et al. | |
| 10,680,387 B2 | 6/2020 | Cheng et al. | |
| 10,714,875 B2 | 7/2020 | Wan et al. | |
| 10,741,944 B2 | 8/2020 | Long | |
| 10,777,921 B2 | 9/2020 | Lu et al. | |
| 10,797,446 B2 | 10/2020 | Liu et al. | |
| 10,826,214 B2 | 11/2020 | Phillips et al. | |
| 10,833,437 B2 | 11/2020 | Huang et al. | |
| 10,840,622 B2 | 11/2020 | Sasame et al. | |
| 10,855,020 B1 | 12/2020 | Phillips et al. | |
| 10,916,894 B2 | 2/2021 | Kirk et al. | |
| 10,950,961 B2 | 3/2021 | Lai et al. | |
| 10,965,064 B2 | 3/2021 | Hsu et al. | |
| 11,146,025 B2 | 10/2021 | Lu et al. | |
| 11,189,971 B2 | 11/2021 | Lu | |
| 11,217,942 B2 | 1/2022 | Lu | |
| 11,264,755 B2 | 3/2022 | Te | |
| 11,303,065 B2 | 4/2022 | Wang et al. | |
| 11,381,015 B2 | 7/2022 | Lu | |
| 11,444,397 B2 | 9/2022 | Sasame et al. | |
| 11,588,277 B2 | 2/2023 | Jiang | |
| 11,621,525 B2 | 4/2023 | Lin | |
| 11,652,307 B2 | 5/2023 | Yue | |
| 11,710,917 B2 * | 7/2023 | Hou .................. | H01R 13/6477 439/630 |
| 11,764,522 B2 | 9/2023 | Hsu et al. | |
| 11,799,230 B2 | 10/2023 | Jiang | |
| 11,817,639 B2 | 11/2023 | Yi et al. | |
| 11,870,171 B2 | 1/2024 | Guo et al. | |
| 11,955,742 B2 | 4/2024 | Sasame et al. | |
| 2006/0166560 A1 | 7/2006 | Shuey et al. | |
| 2008/0246555 A1 | 10/2008 | Kirk et al. | |
| 2008/0248658 A1 | 10/2008 | Cohen et al. | |
| 2008/0248659 A1 | 10/2008 | Cohen et al. | |

(56) References Cited

U.S. PATENT DOCUMENTS

| | | | |
|---|---|---|---|
| 2008/0248660 A1 | 10/2008 | Kirk et al. |
| 2009/0011641 A1 | 1/2009 | Cohen et al. |
| 2009/0011645 A1 | 1/2009 | Laurx et al. |
| 2009/0035955 A1 | 2/2009 | McNamara |
| 2009/0061661 A1 | 3/2009 | Shuey et al. |
| 2009/0117386 A1 | 5/2009 | Vacanti et al. |
| 2009/0203259 A1 | 8/2009 | Nguyen et al. |
| 2009/0239395 A1 | 9/2009 | Cohen et al. |
| 2009/0258516 A1 | 10/2009 | Hiew et al. |
| 2009/0291593 A1 | 11/2009 | Atkinson et al. |
| 2009/0305530 A1 | 12/2009 | Ito et al. |
| 2009/0305533 A1 | 12/2009 | Feldman et al. |
| 2009/0305553 A1 | 12/2009 | Thomas et al. |
| 2010/0048058 A1 | 2/2010 | Morgan et al. |
| 2010/0068934 A1 | 3/2010 | Li et al. |
| 2010/0075538 A1 | 3/2010 | Ohshida |
| 2010/0081302 A1 | 4/2010 | Atkinson et al. |
| 2010/0112846 A1 | 5/2010 | Kotaka |
| 2010/0124851 A1 | 5/2010 | Xiong et al. |
| 2010/0144167 A1 | 6/2010 | Fedder et al. |
| 2010/0203772 A1 | 8/2010 | Mao et al. |
| 2010/0291806 A1 | 11/2010 | Minich et al. |
| 2010/0294530 A1 | 11/2010 | Atkinson et al. |
| 2011/0003509 A1 | 1/2011 | Gailus |
| 2011/0067237 A1 | 3/2011 | Cohen et al. |
| 2011/0104948 A1 | 5/2011 | Girard, Jr. et al. |
| 2011/0130038 A1 | 6/2011 | Cohen et al. |
| 2011/0136388 A1 | 6/2011 | Fu et al. |
| 2011/0143605 A1 | 6/2011 | Pepe |
| 2011/0212649 A1 | 9/2011 | Stokoe et al. |
| 2011/0212650 A1 | 9/2011 | Amleshi et al. |
| 2011/0230095 A1 | 9/2011 | Atkinson et al. |
| 2011/0230096 A1 | 9/2011 | Atkinson et al. |
| 2011/0256739 A1 | 10/2011 | Toshiyuki et al. |
| 2011/0287663 A1 | 11/2011 | Gailus et al. |
| 2012/0094536 A1 | 4/2012 | Khilchenko et al. |
| 2012/0156929 A1 | 6/2012 | Manter et al. |
| 2012/0184145 A1 | 7/2012 | Zeng |
| 2012/0184154 A1 | 7/2012 | Frank et al. |
| 2012/0202363 A1 | 8/2012 | McNamara et al. |
| 2012/0202386 A1 | 8/2012 | McNamara et al. |
| 2012/0202387 A1 | 8/2012 | McNamara |
| 2012/0214344 A1 | 8/2012 | Cohen et al. |
| 2013/0012038 A1 | 1/2013 | Kirk et al. |
| 2013/0017733 A1 | 1/2013 | Kirk et al. |
| 2013/0065454 A1 | 3/2013 | Milbrand, Jr. |
| 2013/0078870 A1 | 3/2013 | Milbrand, Jr. |
| 2013/0078871 A1 | 3/2013 | Milbrand, Jr. |
| 2013/0090001 A1 | 4/2013 | Kagotani |
| 2013/0109232 A1 | 5/2013 | Paniaqua |
| 2013/0143442 A1 | 6/2013 | Cohen et al. |
| 2013/0196550 A1 | 8/2013 | Casher et al. |
| 2013/0196553 A1 | 8/2013 | Gailus |
| 2013/0217263 A1 | 8/2013 | Pan |
| 2013/0225006 A1 | 8/2013 | Khilchenko et al. |
| 2013/0237100 A1 | 9/2013 | Affeltranger |
| 2013/0316590 A1 | 11/2013 | Hon |
| 2014/0004724 A1 | 1/2014 | Cartier, Jr. et al. |
| 2014/0004726 A1 | 1/2014 | Cartier, Jr. et al. |
| 2014/0004746 A1 | 1/2014 | Cartier, Jr. et al. |
| 2014/0024263 A1 | 1/2014 | Dong et al. |
| 2014/0057498 A1 | 2/2014 | Cohen |
| 2014/0113487 A1 | 4/2014 | Chen et al. |
| 2014/0242845 A1 | 8/2014 | Miki et al. |
| 2014/0273557 A1 | 9/2014 | Cartier, Jr. et al. |
| 2014/0273627 A1 | 9/2014 | Cartier, Jr. et al. |
| 2014/0370729 A1 | 12/2014 | Wang |
| 2014/0377992 A1 | 12/2014 | Chang et al. |
| 2015/0056856 A1 | 2/2015 | Atkinson et al. |
| 2015/0072546 A1 | 3/2015 | Li |
| 2015/0099408 A1 | 4/2015 | Myer et al. |
| 2015/0111401 A1 | 4/2015 | Guo |
| 2015/0111427 A1 | 4/2015 | Wu et al. |
| 2015/0126068 A1 | 5/2015 | Fang |
| 2015/0140866 A1 | 5/2015 | Tsai et al. |
| 2015/0214673 A1 | 7/2015 | Gao et al. |
| 2015/0236451 A1 | 8/2015 | Cartier, Jr. et al. |
| 2015/0236452 A1 | 8/2015 | Cartier, Jr. et al. |
| 2015/0255904 A1 | 9/2015 | Ito |
| 2015/0255926 A1 | 9/2015 | Paniagua |
| 2015/0340798 A1 | 11/2015 | Kao et al. |
| 2016/0118736 A1 | 4/2016 | Hoyack et al. |
| 2016/0149343 A1 | 5/2016 | Atkinson et al. |
| 2016/0268744 A1 | 9/2016 | Little et al. |
| 2017/0077654 A1 | 3/2017 | Yao et al. |
| 2017/0179651 A1 | 6/2017 | Chen |
| 2017/0302031 A1 | 10/2017 | Cheng et al. |
| 2017/0352970 A1 | 12/2017 | Liang et al. |
| 2018/0062323 A1 | 3/2018 | Kirk et al. |
| 2018/0076555 A1 | 3/2018 | Scholeno et al. |
| 2018/0145438 A1 | 5/2018 | Cohen |
| 2018/0198220 A1 | 7/2018 | Sasame et al. |
| 2018/0205177 A1 | 7/2018 | Zhou et al. |
| 2018/0212376 A1 | 7/2018 | Wang et al. |
| 2018/0212385 A1 | 7/2018 | Little |
| 2018/0219331 A1 | 8/2018 | Cartier, Jr. et al. |
| 2018/0241156 A1 | 8/2018 | Huang et al. |
| 2018/0269607 A1 | 9/2018 | Wu et al. |
| 2018/0331444 A1 | 11/2018 | Ono |
| 2019/0006778 A1 | 1/2019 | Fan et al. |
| 2019/0044284 A1 | 2/2019 | Dunham |
| 2019/0052019 A1 | 2/2019 | Huang et al. |
| 2019/0067854 A1 | 2/2019 | Ju et al. |
| 2019/0165518 A1 | 5/2019 | Hsu et al. |
| 2019/0173209 A1 | 6/2019 | Lu et al. |
| 2019/0173232 A1 | 6/2019 | Lu et al. |
| 2019/0214755 A1 | 7/2019 | Manickam |
| 2019/0334292 A1 | 10/2019 | Cartier, Jr. et al. |
| 2020/0021052 A1 | 1/2020 | Milbrand, Jr. et al. |
| 2020/0076131 A1 | 3/2020 | Hu et al. |
| 2020/0076135 A1 | 3/2020 | Tang et al. |
| 2020/0083627 A1 | 3/2020 | Peloza et al. |
| 2020/0153134 A1 | 5/2020 | Sasame et al. |
| 2020/0161811 A1 | 5/2020 | Lu |
| 2020/0203865 A1 | 6/2020 | Wu et al. |
| 2020/0203867 A1 | 6/2020 | Lu |
| 2020/0203886 A1 | 6/2020 | Wu et al. |
| 2020/0235529 A1 | 7/2020 | Kirk et al. |
| 2020/0259294 A1 | 8/2020 | Lu |
| 2020/0266584 A1 | 8/2020 | Lu |
| 2020/0274269 A1 | 8/2020 | Teh |
| 2020/0328541 A1 | 10/2020 | Lai et al. |
| 2020/0335914 A1 | 10/2020 | Hsu et al. |
| 2020/0358226 A1 | 11/2020 | Lu et al. |
| 2020/0395698 A1 | 12/2020 | Hou et al. |
| 2020/0403350 A1 | 12/2020 | Hsu |
| 2021/0036452 A1 | 2/2021 | Phillips et al. |
| 2021/0050683 A1 | 2/2021 | Sasame et al. |
| 2021/0126404 A1 | 4/2021 | Laurx et al. |
| 2021/0135389 A1 | 5/2021 | Jiang |
| 2021/0135403 A1 | 5/2021 | Yang et al. |
| 2021/0135404 A1 | 5/2021 | Jiang |
| 2021/0203104 A1 | 7/2021 | Chen |
| 2021/0218195 A1 | 7/2021 | Hsu et al. |
| 2021/0313726 A1 | 10/2021 | Huang et al. |
| 2021/0351529 A1 | 11/2021 | Yang et al. |
| 2021/0399449 A1 | 12/2021 | Guo et al. |
| 2022/0059954 A1 | 2/2022 | Yue |
| 2022/0069496 A1 | 3/2022 | Yi et al. |
| 2022/0077632 A1 | 3/2022 | Chen et al. |
| 2022/0336980 A1 | 10/2022 | Lu |
| 2022/0360016 A1 | 11/2022 | Lu et al. |
| 2023/0013147 A1 | 1/2023 | Lu |
| 2023/0253724 A1 | 8/2023 | Sasame et al. |
| 2023/0318213 A1 | 10/2023 | Lu |
| 2023/0318228 A1 | 10/2023 | Lu |
| 2023/0318229 A1 | 10/2023 | Lu |

FOREIGN PATENT DOCUMENTS

| | | |
|---|---|---|
| CN | 101019277 A | 8/2007 |
| CN | 101312275 A | 11/2008 |
| CN | 201323275 Y | 10/2009 |
| CN | 101600293 A | 12/2009 |

(56) References Cited

FOREIGN PATENT DOCUMENTS

| | | | |
|---|---|---|---|
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102714363 | A | 10/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 203445304 | U | 2/2014 |
| CN | 103840285 | A | 6/2014 |
| CN | 203690614 | U | 7/2014 |
| CN | 204030057 | U | 12/2014 |
| CN | 104347991 | A | 2/2015 |
| CN | 204167554 | U | 2/2015 |
| CN | 104409906 | A | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 104882691 | A | 9/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 106159510 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 108604760 | A | 9/2018 |
| CN | 208014938 | U | 10/2018 |
| CN | 208014954 | U | 10/2018 |
| CN | 208045773 | U | 11/2018 |
| CN | 208045777 | U | 11/2018 |
| CN | 208078300 | U | 11/2018 |
| CN | 208209042 | U | 12/2018 |
| CN | 208444976 | U | 1/2019 |
| CN | 208445005 | U | 1/2019 |
| CN | 208461040 | U | 2/2019 |
| CN | 208461071 | U | 2/2019 |
| CN | 208461073 | U | 2/2019 |
| CN | 208608398 | U | 3/2019 |
| CN | 208690588 | U | 4/2019 |
| CN | 208797273 | U | 4/2019 |
| CN | 209045918 | U | 6/2019 |
| CN | 209374758 | U | 9/2019 |
| CN | 210326355 | U | 4/2020 |
| CN | 112072400 | A | 12/2020 |
| CN | 212412336 | U | 1/2021 |
| CN | 107706675 | B | 4/2021 |
| CN | 212874843 | U | 4/2021 |
| CN | 113517619 | A | 10/2021 |
| CN | 214797865 | U | 11/2021 |
| CN | 215377861 | U | 12/2021 |
| CN | 307082539 | S | 1/2022 |
| CN | 217306859 | U | 8/2022 |
| CN | 217903515 | U | 11/2022 |
| CN | 218123778 | U | 12/2022 |
| CN | 218827985 | U | 4/2023 |
| CN | 218867558 | U | 4/2023 |
| EP | 2169770 | A2 | 3/2010 |
| EP | 2405537 | A1 | 1/2012 |
| JP | 2010-129173 | A | 6/2010 |
| TW | M357771 | U | 5/2009 |
| TW | M474278 | U | 3/2014 |
| TW | M502979 | U | 6/2015 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M567976 | U | 10/2018 |
| TW | M576774 | U | 4/2019 |
| TW | M605564 | U | 12/2020 |
| TW | M613035 | U | 6/2021 |
| TW | M614642 | U | 7/2021 |
| TW | M614728 | U | 7/2021 |
| TW | D217160 | S | 2/2022 |
| TW | M629885 | U | 7/2022 |
| TW | M631787 | U | 9/2022 |
| TW | D221885 | S | 11/2022 |
| TW | D221886 | S | 11/2022 |
| TW | M633882 | U | 11/2022 |
| TW | M639684 | U | 4/2023 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2010/030622 | A1 | 3/2010 |
| WO | WO 2010/039188 | A1 | 4/2010 |
| WO | WO 2011/100740 | A2 | 8/2011 |
| WO | WO 2017/007429 | A1 | 1/2017 |

OTHER PUBLICATIONS

U.S. Appl. No. 17/283,511, filed Apr. 7, 2021, Guo et al.
U.S. Appl. No. 17/402,255, filed Aug. 13, 2021, Yi et al.
U.S. Appl. No. 17/736,248, filed May 4, 2022, Lu et al.
U.S. Appl. No. 17/856,507, filed Jul. 1, 2022, Lu et al.
U.S. Appl. No. 17/867,067, filed Jul. 18, 2022, Hsu.
U.S. Appl. No. 17/942,435, filed Sep. 12, 2022, Sasame et al.
U.S. Appl. No. 18/193,552, filed Mar. 30, 2023, Lu.
U.S. Appl. No. 18/193,555, filed Mar. 30, 2023, Lu.
U.S. Appl. No. 18/193,561, filed Mar. 30, 2023, Lu.
CN 201780097919.9, Mar. 10, 2021, Chinese Office Action.
CN 201780097919.9, Dec. 3, 2021, Chinese Office Action.
EP 17930428.2, May 19, 2021, Extended European Search Report.
EP 17930428.2, Sep. 8, 2022, European Communication.
PCT/CN2017/108344, Aug. 1, 2018, International Search Report and Written Opinion.
PCT/CN2017/108344, Mar. 6, 2020, International Preliminary Report on Patentability Chapter II.
TW 107138468, Jun. 16, 2022, Taiwanese Office Action.
Chinese Office Action dated Oct. 20, 2023 in connection with Chinese Application No. 202210140257.1.
Taiwanese Office Action dated Jan. 8, 2024 in connection with Taiwanese Application No. 112102917.
Chinese Office Action for Chinese Application No. 201780097919.9, dated Mar. 10, 2021.
Chinese Office Action for Chinese Application No. 201780097919.9, dated Dec. 3, 2021.

(56) References Cited

OTHER PUBLICATIONS

Extended European Search Report dated May 19, 2021 in connection with European Application No. 17930428.2.
European Communication Pursuant to Article 94(3) EPC dated Sep. 8, 2022 for European Application No. 17930428.2.
International Search Report and Written Opinion for International Application No. PCT/CN2017/108344 dated Aug. 1, 2018.
International Preliminary Report on Patentability Chapter II for International Application No. PCT/CN2017/108344 mailed Mar. 6, 2020.
Taiwanese Office Action dated Jun. 16, 2022 for Taiwan Application No. 107138468.
[No Author Listed], High Speed Backplane Connectors . Tyco Electronics. Product Catalog No. 1773095. Revised Dec. 2008. 1-40 pages.
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], SFF-TA-1016 Specification for Internal Unshielded High Speed Connector System. Rev 0.0.1. SNIA SFF TWG Technology Affiliate. Nov. 15, 2019. 40 pages.
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].
Lu, Electrical Connector With Segments Having Different Widths, U.S. Appl. No. 18/193,555, filed Mar. 30, 2023.
Lu, Electrical Connector With A Housing Surrounded By A Shell With Surface Protrusions, U.S. Appl. No. 18/193,552, filed Mar. 30, 2023.
Lu, Multi-Width Electrical Connector With Recessed Neck Segment, U.S. Appl. No. 18/193,561, filed Mar. 30, 2023.

* cited by examiner

LOW CROSSTALK CARD EDGE CONNECTOR

CROSS-REFERENCE TO RELATED APPLICATIONS

This application is a continuation of U.S. patent application Ser. No. 16/760,400, filed on Apr. 29, 2020, entitled "LOW CROSSTALK CARD EDGE CONNECTOR," which is a 35 U.S.C. § 371 National Phase filing of International Application No. PCT/CN2017/108344, filed on Oct. 30, 2017, entitled "LOW CROSSTALK CARD EDGE CONNECTOR." The contents of these applications are incorporated herein by reference in their entirety.

TECHNICAL FIELD

The technology described herein relates generally to electrical connectors used to interconnect electronic systems.

BACKGROUND

Electrical connectors are used in many ways within electronic systems and to connect different electronic systems together. For example, printed circuit boards (PCBs) can be electrically coupled using one or more electrical connectors, allowing individual PCBs to be manufactured for particular purposes and electrically coupled with a connector to form a desired system rather than manufacturing the entire system as a single assembly. One type of electrical connector is an "edge connector," which is a type of female connector that interfaces directly with conductive traces on or near the edge of a PCB without the need for a separate male connector because the PCB itself acts as the male connector that interfaces with the edge connector. In addition to providing electrical connections between a PCB and another electronic system, some edge connector may also provide mechanical support for the inserted PCB such that the PCB is held in a substantially immovable position relative to the other electronic system.

Some electrical connectors utilize differential signaling to transmit a signal from a first electronic system to a second electronic system. Specifically, a pair of conductors is used to transmit a signal. One conductor of the pair is driven with a first voltage and the other conductor is driven with a voltage complementary to the first voltage. The difference in voltage between the two conductors represents the signal. An electrical connector may include multiple pairs of conductors to transmit multiple signals. To control the impedance of these conductors and to reduce crosstalk between the signals, ground conductors may be included adjacent each pair of conductors.

As electronic systems have become smaller, faster and functionally more complex, both the number of circuits in a given area and the operational frequencies have increased. Consequently, the electrical connectors used to interconnect these electronic systems are required to handle the transfer of data at higher speeds without significantly distorting the data signals (via, e.g., cross-talk and/or interference) using electrical contacts that have a high density (e.g., a pitch less than 1 mm, where the pitch is the distance between adjacent electrical contacts within an electrical connector).

BRIEF SUMMARY

According to one aspect of the present application, an electrical connector is provided. The electrical connector may include a first set of conductors, each of the first set of conductors including a tip portion, a tail portion, a contact portion disposed between the tail portion and the tip portion, and a body portion disposed between the tail portion and the contact portion; a first overmolding in physical contact with the body portion of each of the first set of conductors; a second set of conductors, each of the second set of conductors comprising a tip portion, a tail portion, a contact portion disposed between the tail portion and the tip portion, and a body portion disposed between the tail portion and the contact portion; a second overmolding in physical contact with the body portion of each of the second set of conductors; and a spacer in contact with the first overmolding and the second overmolding, wherein there is a gap between the spacer and at least one of the first set of conductors and a gap between the spacer and at least one of the second set of conductors.

According to another aspect of the present application, an electrical connector is provided. The electrical connector may include an insulative housing, the insulative housing including at least one opening; a plurality of conductors held by the housing, each of the plurality of conductors including a tip portion, a tail portion, a contact portion disposed between the tail portion and the tip portion, and a body portion disposed between the tail portion and the contact portion. The tail portions of the plurality of conductors may extend from the housing. The contact portions of the plurality of conductors may be exposed within the at least one opening. The body portions of the plurality of conductors may have a first thickness. The tip portions of the plurality of conductors may have a second thickness, less than the first thickness.

According to another aspect of the present application, an electrical connector is provided. The electrical connector may include an insulative housing, the insulative housing including at least one opening; a plurality of conductors held by the housing, each of the plurality of conductors including a tip portion, a tail portion, a contact portion disposed between the tail portion and the tip portion, and a body portion disposed between the tail portion and the contact portion. The plurality of conductors may be arranged in a row with a uniform pitch between tip portions and tail portions. The plurality of conductors may include a plurality of groups of at least three conductors, each group including a first conductor, a second conductor and a third conductor. The plurality of conductors may include a first region in which: the body portions of the first conductor and the second conductor of each group of the plurality of groups has the same first width; the third conductor of the group has a second width, greater than the first width; and the edge to edge separation between the first conductor and the second conductor and between the second conductor and the third conductor is the same.

According to another aspect of the present application, an electrical connector is provided. The electrical connector may include a plurality of conductors, each of the plurality of conductors including a tip portion, a tail portion, a contact portion disposed between the tail portion and the tip portion, and a body portion disposed between the tail portion and the contact portion, the plurality of conductors including a plurality of groups including at least three conductors, each group of the plurality of groups including a first and second conductors having a first maximum width and a third conductor having a second maximum width that is greater than the first maximum width; an overmolding in physical contact with the body portion of each of the plurality of conductors; and a spacer in contact with the overmolding.

The at least one of the spacer and the overmolding may include a plurality of slots adjacent the third conductors of the plurality of groups.

The foregoing is a non-limiting summary of the invention, which is defined by the appended claims.

BRIEF DESCRIPTION OF DRAWINGS

The accompanying drawings are not necessarily drawn to scale. For the purposes of clarity, not every component may be labeled in every drawing. In the drawings:

FIG. 20A is a plot of the power-summed near end crosstalk (NEXT) for a first pair of conductors in an electrical connector, according to some embodiments.

FIG. 20B is a plot of the power-summed far end crosstalk (FEXT) for a first pair of conductors in an electrical connector, according to some embodiments.

FIG. 20C is a plot of the power-summed NEXT for a second pair of conductors in an electrical connector, according to some embodiments.

FIG. 20D is a plot of the power-summed FEXT for a second pair of conductors in an electrical connector, according to some embodiments.

DETAILED DESCRIPTION

Figure 1:
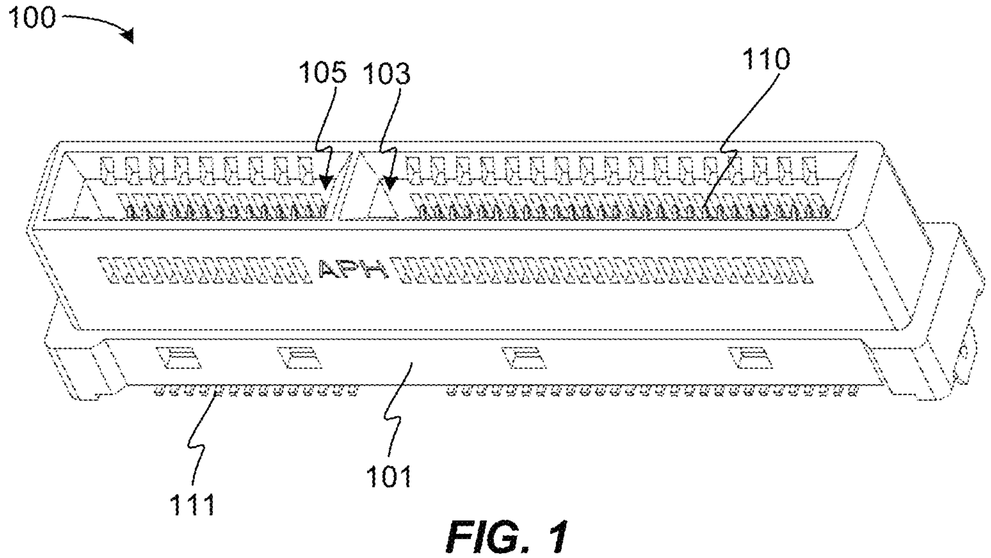
FIG. 1 is a perspective view of a vertical connector, according to some embodiments.

The inventors have recognized and appreciated designs that reduce crosstalk between the individual conductors within a high speed, high density electrical connector. Reducing crosstalk maintains the fidelity of the multiple signals passing through the electrical conductor. The design techniques described herein may be employed, either alone or in combination, in a connector that meets other requirements, such as a small volume, a sufficient contact force, and mechanical robustness.

Crosstalk arises in an electrical connector due to electromagnetic coupling between the individual conductors within the electrical connector. The coupling between signal conductors generally increases as the distance between conductors decreases. As such, a first conductor within an electrical connector may couple more with a second conductor within the electrical connector. Other conductors that are not directly adjacent to the first conductor may, however, couple to the first conductor in a manner that creates crosstalk. Thus, to reduce crosstalk in an electrical connector, the coupling from all the conductors of an electrical connector should be considered.

Crosstalk is undesirable in an electrical connector because, among other issues, it may reduce the signal-to-noise ratio (SNR) of a signal transmitted on a conductor of the electrical connector. Crosstalk effects are particularly severe in high-density connectors, where the distance separating adjacent conductors (i.e., "the pitch") is small (e.g., less than 1 mm). Furthermore, crosstalk is frequency dependent and use of large frequencies (e.g., greater than 20 GHz) for high-speed signals tends to result in increased crosstalk.

The inventors have further recognized and appreciated that, while many features may affect the crosstalk of electrical connector, the electrical and mechanical constraints on electrical connectors (e.g., the need for a particular spacing of conductors, a particular speed of communication, a particular contact force the conductors must apply to an inserted PCB, the mechanical robustness of the electrical connector as a whole) make it difficult to precisely control crosstalk. The inventors have, however, identified features of an electrical connector that reduce crosstalk while maintaining the other electrical and mechanical requirements of electrical connectors. In particular, the inventors have recognized and appreciated that, the crosstalk between individual conductors is affected by the size of the individual conductors of the electrical connector, the shape of the individual conductors of the electrical connector, the distance between adjacent conductors of the electrical connector, and the material that is in direct contact with various portions of the individual conductors of the electrical connector. Accordingly, one or more of these properties of an electrical connector can be adjusted to form an electrical connector with desirable electrical properties. For example, in some embodiments, a distance between a first signal conductor and a second signal conductor of a pair of conductors may be a uniform distance over particular regions of the conductors and/or a distance between the second signal conductor and a ground contact for the pair of conductors may be a uniform distance over particular regions of the conductors. In some embodiments, the pair of conductors may be a differential signal pair that include a first signal conductor and a second signal conductor. In some embodiments, the pair of conductors may be thinner than an associated ground conductor. In some embodiments, the distance between the first signal conductor and the second signal conductor of a differential signal pair may be equal to the distance between the second signal conductor and the ground contact for the differential signal pair. This equal edge-to-edge spacing is provided even though the group of three conductors, including two signal and one ground conductors, are spaced on the same center-to-center pitch at the tips and tails and the ground conductors are wider than the signal conductors. When the distances between conductors and the widths of conductors are compared, as is done above and throughout the detailed description, the distances/widths are along a line parallel to a row of conductors and perpendicular to the elongated direction of the conductors, unless otherwise stated.

In some embodiments, the shape of a ground conductor of an electrical connector may be a different shape from than a first signal conductor and/or a second signal conductor of the electrical connector. In some embodiments, a first signal conductor of differential conductor pair may be the same shape as a second signal conductor of the differential conductor pair. For example, the shapes of the first and second signal conductors may be the similar, but oriented such that the first signal conductor is a minor image of the second signal conductor. In some embodiments, a tip portion located at a distal end of a conductor of an electrical connector may have a smaller size (e.g., may be thinner, such as may result from coining the tips or other processing steps to reduce the thickness of the tip relative to the thickness of the stock used to form the conductor or may have a cross-sectional area and/or width and/or height) than a contact portion of the conductor. The tip portion may be tapered such that a distal end of the tip portion is smaller in size than a proximal end of the tip portion.

The inventors have recognized and appreciated that selectively adjusting the shape and size of an overmolding and/or other housing components that mechanically hold the individual conductors in place relative to one another may improve performance of the connector. In some embodiments, an overmolding may include openings that expose one or more portions of a conductor to air. Furthermore, openings may be included in the overmolding to expose certain conductors of a group of three conductors without exposing other conductors of the group of three conductors. For example, a slot in the overmolding may expose a portion of the ground conductor of a group of three conductors to air that is not exposed for the two signal conductors of the same group of three conductors. The portion of the ground conductor exposed to air by the slot in the overmolding may be an intermediate portion of the ground conductor that has a width that is smaller than the width of a contact portion of the ground conductor. In another example, a slot in the overmolding may be placed between a first signal conductor and the ground conductor such that a portion of the ground conductor and a portion of the first signal conductor is exposed to air.

The inventors have further recognized and appreciated that selectively controlling the material that is in contact with one or more portions of the individual conductors of an electrical connector by controlling the shape and size of a spacer that separates two sets of conductors that are positioned to be on opposite sides of an inserted PCB may improve performance of the connector. In some embodiments, a spacer may include openings that expose one or more portions of a conductor to air. Furthermore, openings may be included in the spacer to expose certain conductors of a group of three conductors without exposing other conductors of the group of three conductors. For example, a slot in the spacer may expose a portion of the ground conductor of a group of three conductors to air that is not exposed for the two signal conductors of the same group of three conductors. The portion of the ground conductor exposed to air by the slot in the spacer may be an intermediate portion of the ground conductor that has a width that is smaller than the width of a contact portion of the ground conductor. In another example, a slot in the spacer may be located between a first signal conductor and the ground conductor such that a portion of the ground conductor and a portion of the first signal conductor is exposed to air. In addition, the spacer may include a rib portion that is located between a first signal conductor and a second signal conductor of a group of three conductors.

There are different types of card edge connectors, all of which may be used in one or more embodiments. FIG. 1 is a perspective view of a vertical connector 100, according to some embodiments. The vertical connector 100 may be used, for example, to connect a daughtercard to a mother board. The vertical connector 100 includes a housing 101, in which are located multiple conductors 110, which are accessible via an opening 103. A tail end 111 of each conductor 110 may not be within the housing 101, but instead protrude from one side of the housing 101. The vertical connector 100 is configured to be mounted to a first PCB (e.g., a motherboard) or some other electronic system such that each tail end 111 is electrically connected to a conductive portion of the first PCB. A second PCB (e.g., a daughtercard) may be inserted into the opening 103 such that a conductive portion of the second PCB is placed in contact with a respective conductor 110. In this way, a conductive portion of the first PCB are electrically connected to a conductive portion of the second PCB via a conductor 110. The two PCBs may communicate by sending signals using the vertical connector 100 using a standardized protocol, such as a PCI protocol.

In some embodiments, there may be multiple openings configured to receive a PCB. For example, vertical connector 100 includes a second opening 105 for receiving a PCB. The second opening 105 may receive a different portion of the same PCB being received by the first opening 103, or a different PCB. In the embodiment of vertical connector 100 illustrated in FIG. 1, the opening 103 provides access to 56 conductors and the opening 105 provides access to 28 conductors. Half of the conductors 110 within each opening 103/105 are positioned in a row on a first side of a spacer (not visible in FIG. 1) and the other half of the conductors 110 are positioned in a row on a second side of the spacer such that a first half of the conductors 110 make contact with conductors on a first side of an inserted PCB and a second half of the conductors 110 make contact with conductors on a second side of the inserted PCB. The opening 103 may be a slot that is bounded by a first and second wall of the housing 101. In some embodiments, the rows of conductors 110 are aligned along the first wall and the second wall of the housing 101. In some embodiments, channels are formed in the housing 101 so that a tip portion of the conductors may extend into the slots as the conductors are spread apart by the force of a PCB being inserted into the opening 103.

Figure 2:
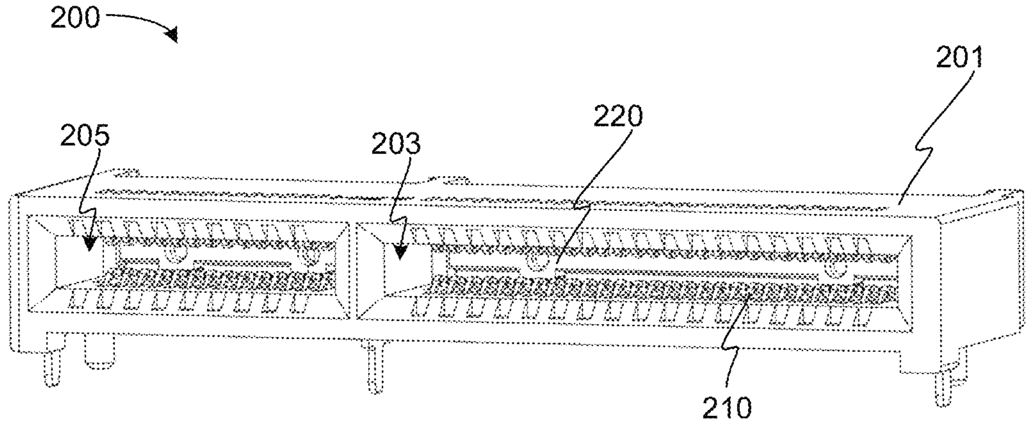
FIG. 2 is a perspective view of a right-angle connector, according to some embodiments.

FIG. 2 is a perspective view of a right-angle connector, according to some embodiments. The right-angle connector 200 may be used, for example, to connect a mezzanine card to a mother board. The right-angle connector 200 includes a housing 201, in which are located multiple conductors 210, which are accessible via an opening 203. A tail end (not visible in FIG. 2) of each conductor 210 may not be within the housing 201, but instead protrude from one side of the housing 201. The right-angle connector 200 is configured to be mounted to a first PCB (e.g., a motherboard) or some other electronic system such that each tail end is electrically connected to a conductive portion of the first PCB. A second PCB (e.g., a mezzanine card) may be inserted into the opening 203 such that a conductive portion of the second PCB is placed in contact with a respective conductor 210. In this way, a conductive portion of the first PCB are electrically connected to a conductive portion of the second PCB via a conductor 210. The two PCBs may communicate by sending signals using the right-angle connector 200 using a standardized protocol, such as a PCI protocol.

In some embodiments, there may be multiple openings configured to receive a PCB. For example, right-angle connector 200 includes a second opening 205 for receiving a PCB. The second opening 205 may receive a different portion of the same PCB being received by the first opening 203. In the embodiment of right-angle connector 200 illustrated in FIG. 2, the opening 203 provides access to 56 conductors and the opening 205 provides access to 28 conductors. Half of the conductors 210 within each opening 203/205 are positioned in a row on a first side of a spacer 220 and the other half of the conductors 210 are positioned in a row on a second side of the spacer such that a first half of the conductors 210 make contact with conductors on a first side of an inserted PCB and a second half of the conductors 210 make contact with conductors on a second side of the inserted PCB. The opening 203 may be a slot that is bounded by a first and second wall of the housing 201. In some embodiments, the rows of conductors 210 are aligned along the first wall and the second wall of the housing 201. In some embodiments, channels are formed in the housing 201 so that a tip portion of the conductors may extend into the slots as the conductors are spread apart by the force of a PCB being inserted into the opening 103.

The housing 101, the housing 201 and/or the spacer 220 may be made, wholly or in part, of an insulating material. Examples of insulating materials that may be used to form the housing 101 include, but are not limited to, plastic, nylon, liquid crystal polymer (LCP), polyphenyline sulfide (PPS), high temperature nylon or polyphenylenoxide (PPO)

or polypropylene (PP). In some embodiments, the housing and the spacer of a particular connector may be made from different insulating material.

The insulating material used to form the housing and/or spacer of an electrical connector may be molded to form the desired shape. The housing and spacer may, together, hold the plurality of conductors with contact portions in position to such that when a PCB is inserted, the contact portion of each conductor is in physical contact with a conductive portion of the PCB. The housing may be molded around the conductors or, alternatively, the housing may be molded with passages configured to receive the conductors, which may then be inserted into the passages.

The conductors 110 of vertical connector 100 and the conductors of right-angle connector 200 are formed from a conductive material. In some embodiments, the conductive material may be a metal, such as copper, or a metal alloy.

The details of an example embodiment of the vertical connector 100 and an example embodiment the right-angle connector 200 are described below.

A single set of three conductors is referred to as a group of three conductors 300. In the embodiment illustrated, the conductors shaped for use in the vertical connector 100 is first described. Multiple such groups may be aligned in a one or more rows that may be held within an insulative housing of a connector.

Figure 3A:
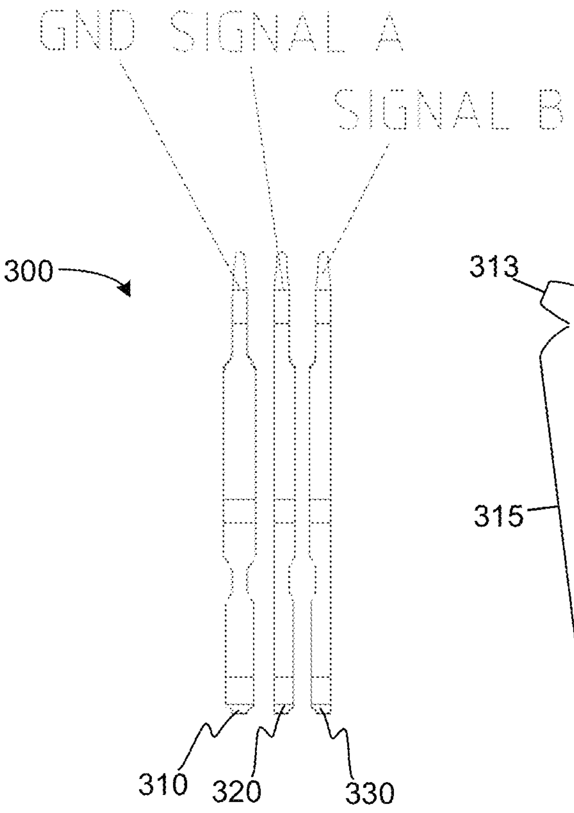
FIG. 3A is a front view of a group of three conductors that may be used in the vertical connector of FIG. 1, according to some embodiments.
Figure 3B:
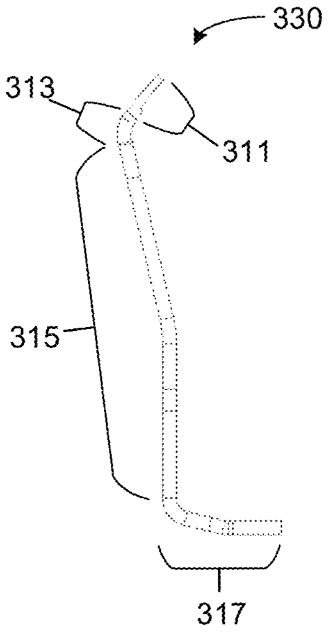
FIG. 3B is a side view of a group of three conductors that may be used in the vertical connector of FIG. 1, according to some embodiments.
Figure 3C:
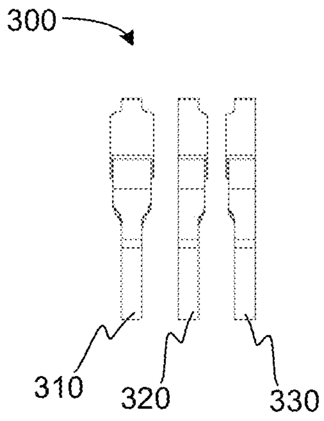
FIG. 3C is a bottom view of a group of three conductors that may be used in the vertical connector of FIG. 1, according to some embodiments.
Figure 3D:
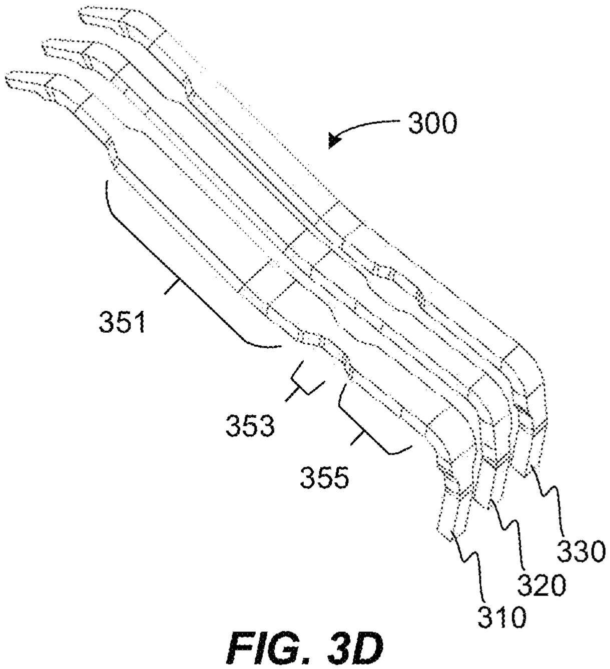
FIG. 3D is a perspective view of a group of three conductors that may be used in the vertical connector of FIG. 1, according to some embodiments.

FIG. 3A is a front view of the group of three conductors 300 that may be used in the vertical connector 100. FIG. 3B is a side view of the group of three conductors 300 that may be used in the vertical connector 100, though only signal conductor 330 is visible because all three conductors have the same profile when viewed from the side. FIG. 3C is a bottom view of the group of three conductors 300 that may be used in the vertical connector 100. FIG. 3D is a perspective view of the group of three conductors that may be used in the vertical connector 100.

The group of three conductors 300 is configured to transfer a differential signal from a first electronic device to a second electronic device. The group of three conductors 300 includes a ground conductor 310, a first signal conductor 320 and a second signal conductor 330. The first signal conductor 320 and the second signal conductor 330 may form a differential signal pair. In some embodiments, the ground conductor 310 is wider than both the first signal conductor 320 and the second signal conductor 330. In some embodiments, the ground conductor 310 may be symmetric along a plane of symmetry that longitudinally bisects the ground conductor 310. In some embodiments, the first signal conductor 320 and the second signal conductor 330 may be asymmetric along a plane that longitudinally bisects the ground conductor each of the signal conductors. In some embodiments the first signal conductor 320 and the second signal conductor 330 are adjacent to one another, meaning there is no other conductor positioned between the first signal conductor 320 and the second signal conductor 330.

Each conductor of the group of three conductors 300 includes a tip portion 311, a contact portion 313, a body portion 315 and a tail portion 317. The body portion 315 of each conductor may include one or more portions, including a first wide portion 351, a second wide portion 355, and a thin portion that is disposed between the first wide portion 351 and the second wide portion 355. In some embodiments, the first wide portion 351 is longer than the second wide portion 355. The body portion 315 may also include tapered portions that transition between the wide portions 351 and 355 and the thin portion 353. In some embodiments, the thin portion 353 corresponds to a location of an overmolding that is formed over the group of conductors 300, which is described in detail below. The thin portion 353 may compensate for the change of impedance in the conductors that results from the introduction of the overmolding material, which has a different dielectric constant than air, onto the conductors.

Each conductor in the group of three conductors 300 may have a different shape. In some embodiments, the first signal conductor 320 and the second signal conductor 330 may be mirror images of one another. For example, a plane of symmetry may exist between the first signal conductor 320 and the second signal conductor 330. In some embodiments, the tapered portions of the body portions 315 of the first signal conductor 320 and the second signal conductor 330 may be tapered only on one side of the respective conductor such that the body portions 315 of the first signal conductor 320 and the second signal conductor 330 are straight. In some embodiments, the first signal conductor 320 and the second signal conductor 330 may be positioned within the electrical connector 100 such that the straight side of the body portion 315 of the first signal conductor 320 is on the side nearest the ground conductor 310 and the straight side of the body portion 315 for the first signal conductor 320 is on the side farthest from the ground conductor 310. In other embodiments, not shown, the straight sides of the first signal conductor 320 and the second signal conductor may be both on the side nearest the ground conductor 310, both on the side farthest from the ground conductor 310, or the straight side of the first signal conductor 320 may be on the side farthest from the ground conductor 310 and the straight side of the second signal conductor 330 may be on the side nearest to the ground conductor 310.

The ground conductor 310 may be a different shape from the two signal conductors 320 and 330. For example, the ground conductor 310 may be symmetrical such that a plane of symmetry may bisect the ground conductor 310 along a length of the ground conductor 310. In some embodiments, the ground conductor 310 may have a body portion 315 that include tapered portions that are tapered on both sides of the ground conductor 310 such that no side along the length of the body portion 315 of the ground conductor 310 is a straight line.

Figure 4:
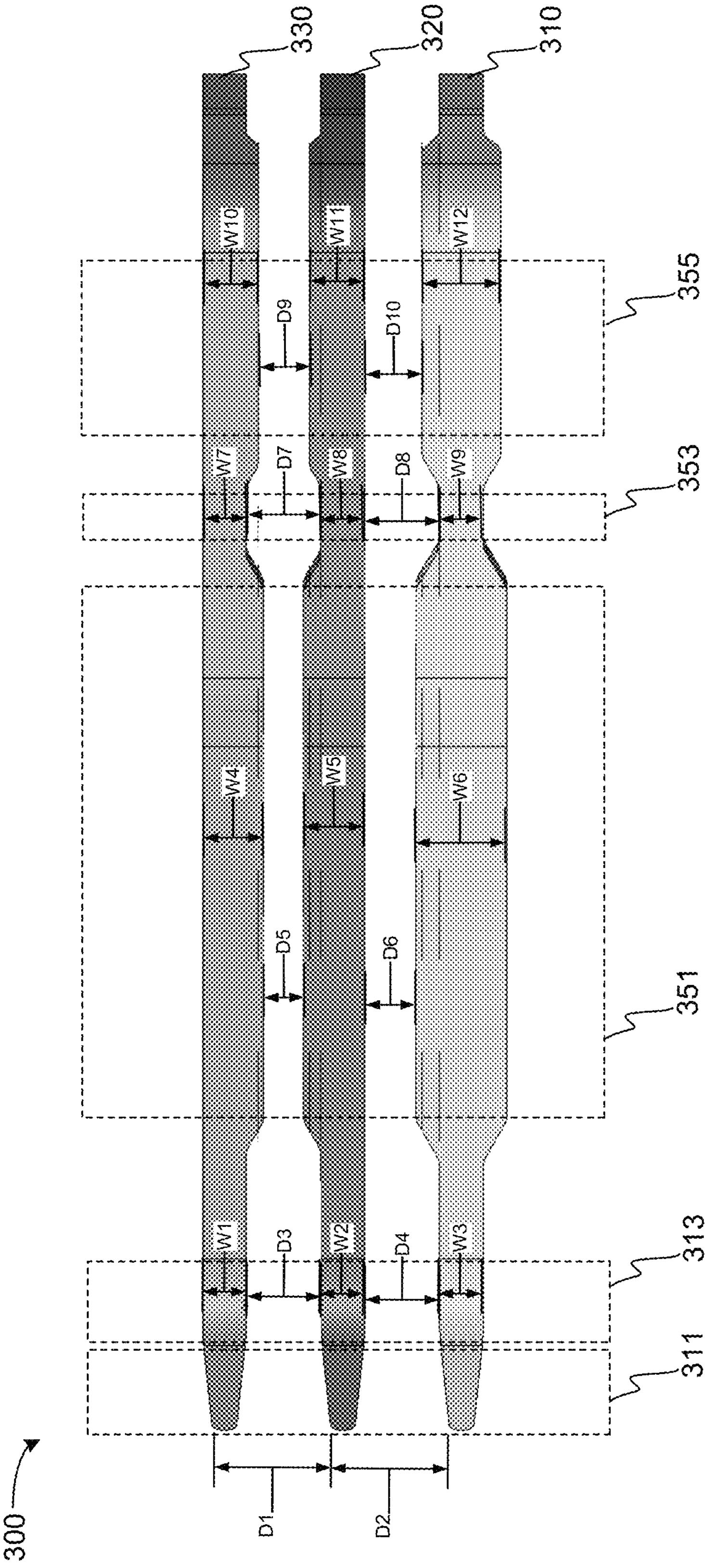
FIG. 4 is a front view of the group of three the conductors of FIGS. 3A-3D.

FIG. 4 is a front view of the group of three conductors, similar to that illustrated in FIG. 3A, but rotated and including labels of various dimensions for the group of three conductors 300. For example, distances D1 through D10 are labeled and widths W1 through W12 are labeled. The dashed boxes indicate the tip portion 311, the contact portion 313, the first wide portion 351 of the body portion 315, the thin portion 353 of the body portion 315, and the second wide portion 355 of the body portion 315.

In some embodiments, the distance (D1) between the distal end of the tip portion 311 of the first signal conductor 320 and the distal end of the tip portion 311 of the second signal conductor 330 is equal to the distance (D2) between the distal end of the tip portion 311 of the first signal conductor 320 and the distal end of the tip portion 311 of the ground conductor 310. In some embodiments, the distance (D3) between the contact portion 313 of the first signal conductor 320 and the contact portion 313 of the second signal conductor 330 is equal to the distance (D4) between the contact portion 313 of the first signal conductor 320 and the contact portion 313 of the ground conductor 310. In some embodiments, the distances D3 and D4 are less than the distances D1 and D2. As a non-limiting example, D1 and D2 may be equal to 0.6 mm and D3 and D4 may be equal to 0.38 mm. The pitch of the electrical connector is equal to the distance D1. Thus, in the example where D1 equals 0.6 mm, the electrical connector 100 may be referred to a 0.6 mm vertical edge connector.

In some embodiments, the distance (D5) between the first wide portion 351 of the first signal conductor 320 and the first wide portion 351 of the second signal conductor 330 may be less than or equal to the distance (D6) between the first wide portion 351 of the first signal conductor 320 and the first wide portion 351 of the ground conductor 310. As a non-limiting example, D5 may be equal to 0.20 mm and D6 may be equal to 0.26 mm. In some embodiments, the distance (D9) between the second wide portion 355 of the first signal conductor 320 and the second wide portion 355 of the second signal conductor 330 may be less than or equal to the distance (D10) between the second wide portion 355 of the first signal conductor 320 and the second wide portion 355 of the ground conductor 310. For example, D9 may be equal to 0.26 mm and D10 may be equal to 0.29 mm. In some embodiments, such as in the example measurements provided above the following conditions may be satisfied: D5<D6; D6=D9; and D9<D10. In some embodiments, the distance (D7) between the thin portion 353 of the first signal conductor 320 and the thin portion 353 of the second signal conductor 330 may be equal to the distance (D8) between the thin portion 353 of the first signal conductor 320 and the thin portion 353 of the ground conductor 310.

In some embodiments, the width (W2) of the contact portion 313 of the first signal conductor 320, the width (W1) of the contact portion 313 of the second signal conductor 330, and the width (W3) of the contact portion 313 of the ground conductor 310 are equal. In some embodiments, the width (W5) of the first wide portion 351 of the first signal conductor 320, the width (W4) of the first wide portion 351 of the second signal conductor 330 are equal and less than the width (W6) of the first wide portion 351 of the ground conductor 310. In some embodiments, the width (W11) of the second wide portion 355 of the first signal conductor 320, the width (W10) of the second wide portion 355 of the second signal conductor 330 are equal and less than the width (W12) of the second wide portion 355 of the ground conductor 310. In some embodiments, W10 is less than W4, W11 is less than W5, and W12 is less than W6. In some embodiments, W12 is greater than W4 and W5. In some embodiments, the width (W8) of the thin portion 353 of the first signal conductor 320, the width (W7) of the thin portion 353 of the second signal conductor 330, and the width (W9) of the thin portion 353 of the ground conductor 310 are equal.

In some embodiments, e.g., the embodiment illustrated in FIG. 4, the uniform width of each of the conductors of the group of three conductors 300 in the first wide portion 351, the thin portion 353, and the second wide portion 355 may reduce the crosstalk resonance between conductors. Furthermore, in some embodiments, the tapered tip portion 311 of each conductor of the group of three conductors 300 may increase the impedance at a mating interface of the electrical connector 100 and reduce the resonance peak at high frequencies (e.g., above 20 GHz) as compared to untampered tip portions.

As discussed in the above numerical examples for FIG. 4, in some embodiments, the distances D5, D6, D9, and D10 are not all the same. This asymmetry in the group of three conductors 300 may reduce the crosstalk between the various conductors. In other embodiments, D5, D6, D9, and D10 may all be the same distance, which may result in better resonance performance, but increase the crosstalk.

Figure 5A:
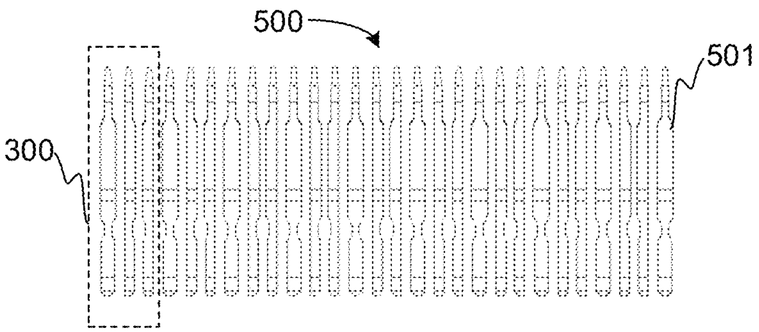
FIG. 5A is a front view of a row of conductors formed from seven groups of three conductors and an additional ground conductor, according to some embodiments.
Figure 5B:
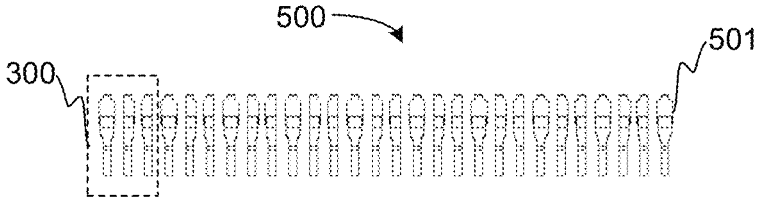
FIG. 5B is a bottom view of the row of conductors formed from seven groups of three conductors and an additional ground conductor, according to some embodiments.
Figure 5C:
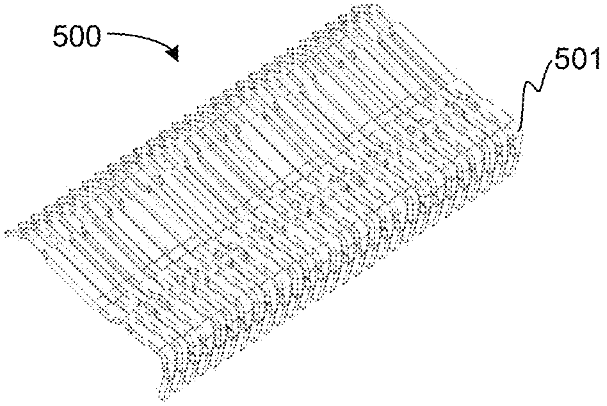
FIG. 5C is a perspective view of the row of conductors formed from seven groups of three conductors and the additional ground conductor, according to some embodiments.

In some embodiments, multiple groups of three conductors 300 may be arranged to form a row of conductors. FIG. 5A is a front view of a row 500 of conductors formed from seven groups of three conductors and an additional ground conductor 501, according to some embodiments. FIG. 5B is a bottom view of the row 500 of conductors formed from seven groups of three conductors and the additional ground conductor 501, according to some embodiments. FIG. 5C is a perspective view of the row 500 of conductors formed from seven groups of three conductors and the additional ground conductor 501, according to some embodiments.

The row 500 of conductors includes multiple groups of three conductors 300, each group of three conductors 300 including a ground conductor 310, a first signal conductor 320, and a second signal conductor 330. Any number of groups of three conductors may be included. In the example shown in FIGS. 5A-C, the row 500 includes seven groups of three conductors. In some embodiments, additional conductors that are not part of a group of three conductors 300 may be included. For example, an extra ground conductor 501 may be included in the row 500.

In some embodiments, the groups of three conductors 300 are positioned such that the tip portion of each conductor in the row 500 is the same distance from the tip portion of each adjacent conductor. For example, if the pitch of tip portions of the conductors within a single group of three conductors 300 is 0.6 mm, then the pitch between the tip portion of the conductor from an immediately adjacent group of three conductors 300 is also 0.6 mm.

Figure 6A:
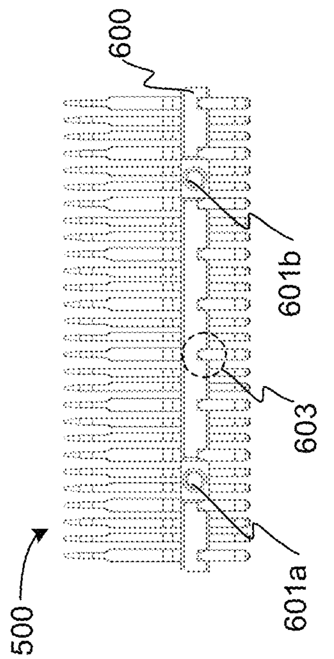
FIG. 6A is a front view of the row of conductors of FIGS. 5A-C with an overmolding, according to some embodiments.
Figure 6B:
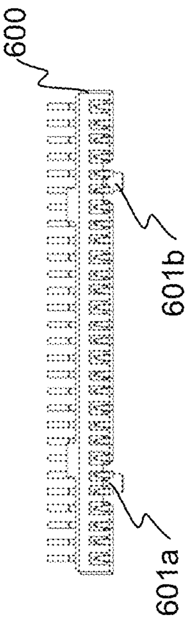
FIG. 6B is a top view of the row of conductors of FIGS. 5A-C with an overmolding, according to some embodiments.
Figure 6C:
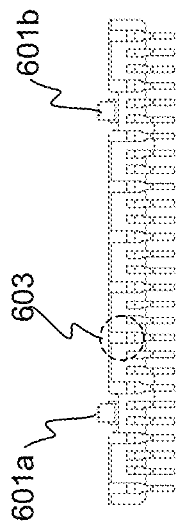
FIG. 6C is a bottom view of the row of conductors of FIGS. 5A-C with an overmolding, according to some embodiments.
Figure 6D:
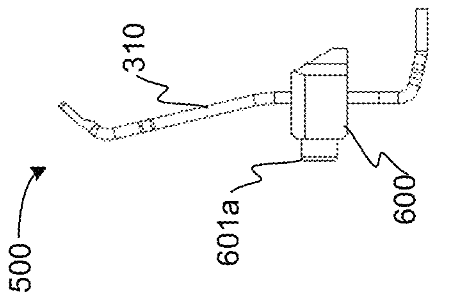
FIG. 6D is a side view of the row of conductors of FIGS. 5A-C with an overmolding, according to some embodiments.
Figure 6E:
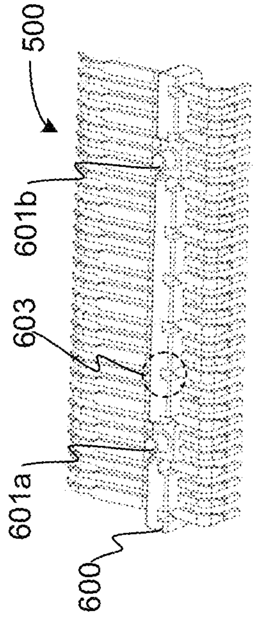
FIG. 6E is a perspective view of the row of conductors of FIGS. 5A-C with an overmolding 600, according to some embodiments.

To hold the conductors in the row 500 in position relative to one another, an overmolding 600 is formed using an insulating material. FIG. 6A is a front view of the row 500 of conductors with an overmolding 600, according to some embodiments. FIG. 6B is a top view of the row 500 of conductors with the overmolding 600, according to some embodiments. FIG. 6C is a bottom view of the row 500 of conductors with the overmolding 600, according to some embodiments. FIG. 6D is a side view of the row 500 of conductors with the overmolding 600, according to some embodiments, though only one ground conductor 310 is visible because all the conductors in the row 500 have the same profile when viewed from the side. FIG. 6E is a perspective view of the row 500 of conductors with the overmolding 600, according to some embodiments.

In some embodiments, the overmolding 600 is disposed over the thin portion 353 of the body portion 315 of each conductor. One or more openings 603 may be formed in the overmolding 600 to expose portions of the conductors in row 500 to air. By exposing different portions of the conductors to different materials (e.g., air versus the insulating material of the overmolding), the electrical properties of the electrical connector can be controlled. In some embodiments, an opening 603 is formed in the overmolding above the ground conductors of the row 500. As shown in FIGS. 6A-E, the opening 603 is a slot that extends from the side of the overmolding 600 nearest the tail portion of the ground conductor to the approximately the middle of the overmolding 600. Embodiments are not limited to forming the opening 603 over the ground conductors. For example, the openings 603 may be formed between the ground conductor 310 and the first signal conductor 320 of each group of three conductors such that at least a portion of the ground conductor 310 and at least a portion of the first signal conductor is exposed to air. In some embodiments, introducing openings 603 in the overmolding 600 may reduce one or more resonances between the conductors. Forming the opening 603 between the ground conductor 310 and the first signal conductor 320 of each group of three conductors may, however, increase the impedance and be difficult to achieve mechanically due to the small size of the overmolding. Therefore, some embodiments only form an opening 603 over the ground conductor 310 of each group of three conductors.

In some embodiments, one or more of the openings may be a hole that is formed in the overmolding 600 that penetrates to the ground conductor such that the ground conductor is exposed to air. Such a hole could be any suitable shape. For example, the hole may be circular, elliptical, rectangular, polygonal, etc.

In some embodiments, the overmolding 600 includes one or more protrusions configured to be inserted into a groove or hole on another portion of the electrical connector, such as the spacer discussed below. For example, in FIGS. 6A-E, the overmolding 600 includes a first protrusion 601*a* and a second protrusion 601*b*, the protrusions being cylindrical in shape and protruding from the overmolding in a direction perpendicular to a direction in which the row 500 is aligned. In some embodiments, the protrusions 601*a* and 601*b* are disposed between two openings 603 formed in the overmolding 600.

Figure 7A:
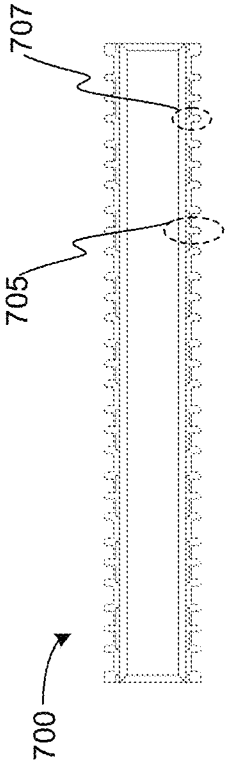
FIG. 7A is a top view of a spacer that may be used in the vertical connector of FIG. 1, according to some embodiments.
Figure 7B:
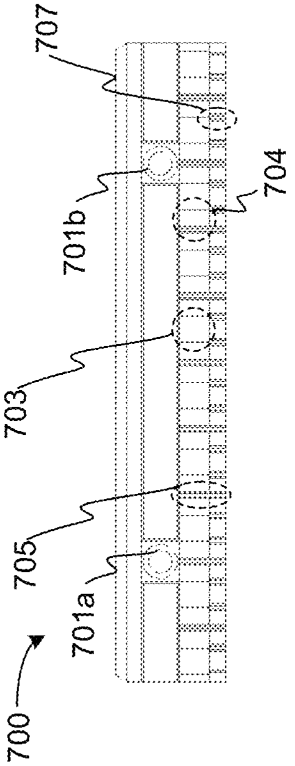
FIG. 7B is a front view of a spacer that may be used in the vertical connector of FIG. 1, according to some embodiments.
Figure 7C:
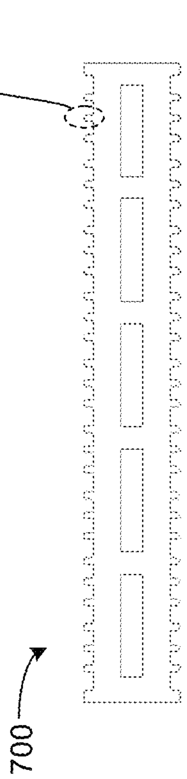
FIG. 7C is a bottom view of a spacer that may be used in the vertical connector of FIG. 1, according to some embodiments.
Figure 7D:
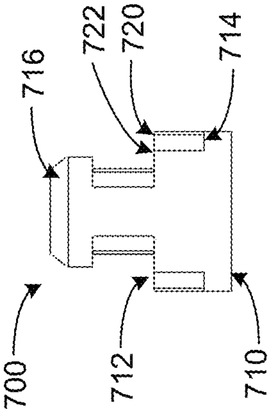
FIG. 7D is a side view of a spacer that may be used in the vertical connector of FIG. 1, according to some embodiments.
Figure 7E:
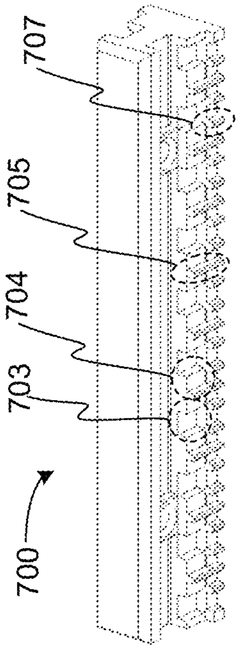
FIG. 7E is a perspective view of a spacer that may be used in the vertical connector of FIG. 1, according to some embodiments.

A spacer may be used to separate two rows of conductors and hold the two rows in position relative to one another. In some embodiments, the spacer is formed from an insulating material. For example, the spacer may be formed via injection molding using a plastic material. FIG. 7A is a top view of a spacer 700 that may be used in electrical connector 100, according to some embodiments. FIG. 7B is a front view of the spacer 700 that may be used in electrical connector 100, according to some embodiments. FIG. 7C is a bottom view of the spacer 700 that may be used in electrical connector 100, according to some embodiments. FIG. 7D is a side view of the spacer 700 that may be used in electrical connector 100, according to some embodiments. FIG. 7E is a perspective view of the spacer 700 that may be used in electrical connector 100, according to some embodiments.

In some embodiments, the spacer 700 includes one or more grooves or holes configured to receive the protrusions included on the overmolding of one or more rows of conductors. For example, a first hole 701*a* may receive the second protrusion 601*b* of the overmolding 600 and a second hole 701*b* may receive the first protrusion 601*a* of the overmolding 600. FIG. 7B illustrates the holes 701*a* and 701*b* on the front of the spacer 700. In some embodiments, there are third and fourth holes on the back surface of the spacer 700 (not shown) for receiving protrusions on a second overmolding for a second row of conductors. In some embodiments, the openings 701*a* and 701*b* are located below a top surface 716 of the spacer 700 and above a horizontal surface 712 of the spacer 700.

In some embodiments, the spacer 700 includes openings 703 that correspond with locations of the ground conductors from the row 500 of conductors. For example, the openings may be a slot or a hole (e.g., a blind hole). In FIGS. 7B and 7E, the openings 703 are shown as slots. The slots do not extend to the bottom surface 710 of the spacer 700. Instead, the slots extend from the horizontal surface 712 of the spacer 700 to a level 714 that is 50% to 75% of the way to the bottom surface 710 of the spacer 700. In some embodiments, the openings 703 extend into the spacer 700 to a depth 722.

In some embodiments, the spacer 700 includes additional openings 704 that correspond to the locations of the signal conductors from the row 500 of conductors. For example, the openings may be a slot or a hole (e.g., a blind hole). In some embodiments, the openings 704 may be less deep (i.e., shallower) than the openings 703. For example, the openings 704 extend into the spacer 700 to a depth 720 which is less deep than the depth 722. In FIGS. 7B and 7E, the openings 704 are shown as slots. The slots do not extend to the bottom surface 710 of the spacer 700. Instead, the slots extend from the horizontal surface 712 of the spacer 700 to a level 714 that is 50% to 75% of the way to the bottom surface 710 of the spacer 700.

In some embodiments, the spacer 700 includes multiple ribs 707 to hold the individual conductors of each row 500 of conductors in place relative to each other and relative to the spacer. For example, the ribs 707 may extend from the bottom surface 710 of the spacer 700 to the level 714. In some embodiments, some but not all of the ribs 705 extend past the level 714 to the horizontal surface 712. For example, the ribs 705 that are longer than the ribs 707 may be the ribs that are positioned between the first signal conductors 720 and the second signal conductors 730.

In some embodiments, the ribs 705 and the openings 703 and the openings 704 may reduce the crosstalk between conductors in a row 500 of the electrical connector 100.

Figure 8C:
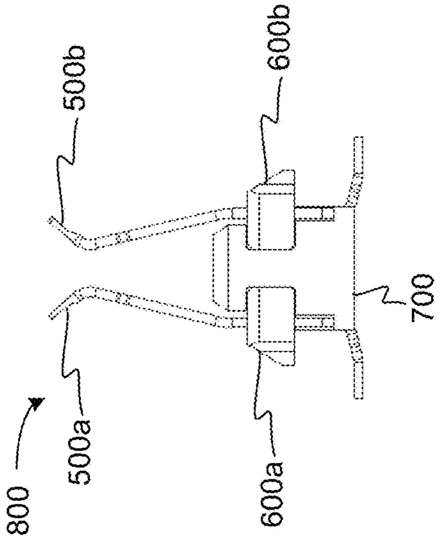
FIG. 8C is a side view of a sub-assembly including a spacer of FIGS. 7A-E and two rows of the conductors with overmolding of FIGS. 6A-E, according to some embodiments.
Figure 8D:
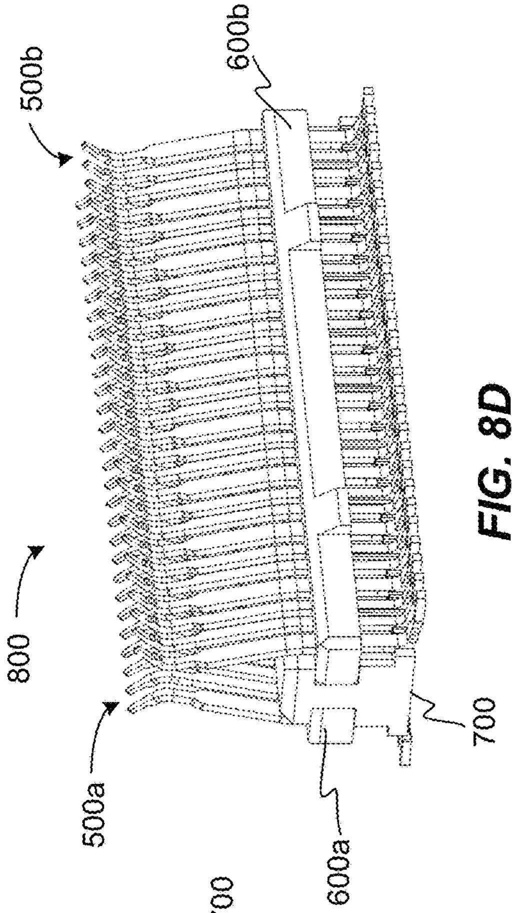
FIG. 8D is a perspective view of a sub-assembly including a spacer of FIGS. 7A-E and two rows of the conductors with overmolding of FIGS. 6A-E, according to some embodiments.
Figure 8A:
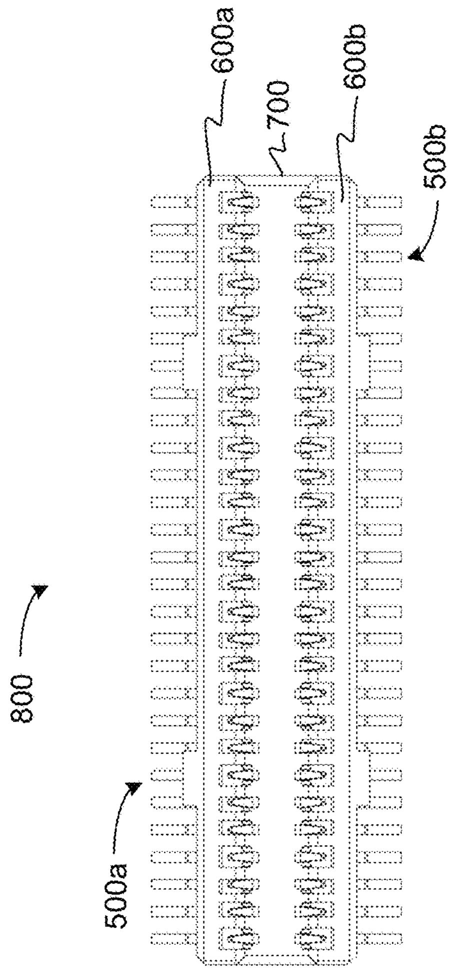
FIG. 8A is a top view of a sub-assembly including a spacer of FIGS. 7A-E and two rows of the conductors with overmolding of FIGS. 6A-E, according to some embodiments.
Figure 8B:
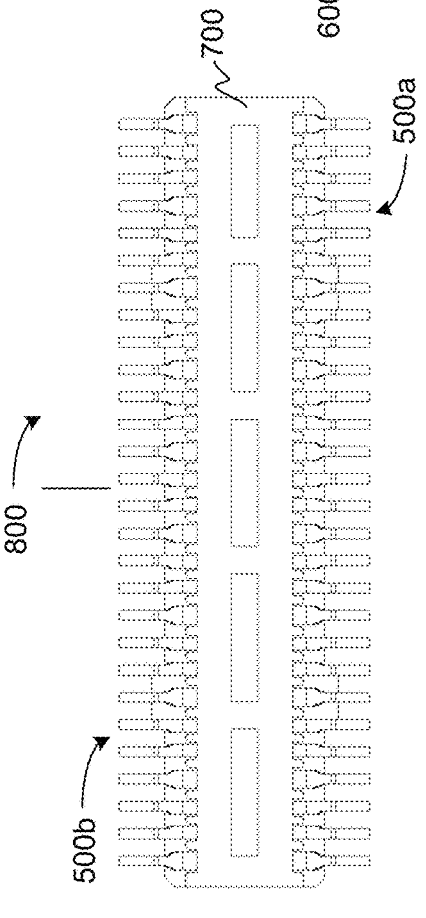
FIG. 8B is a bottom view of a sub-assembly including a spacer of FIGS. 7A-E and two rows of the conductors with overmolding of FIGS. 6A-E, according to some embodiments.
Figure 8E:
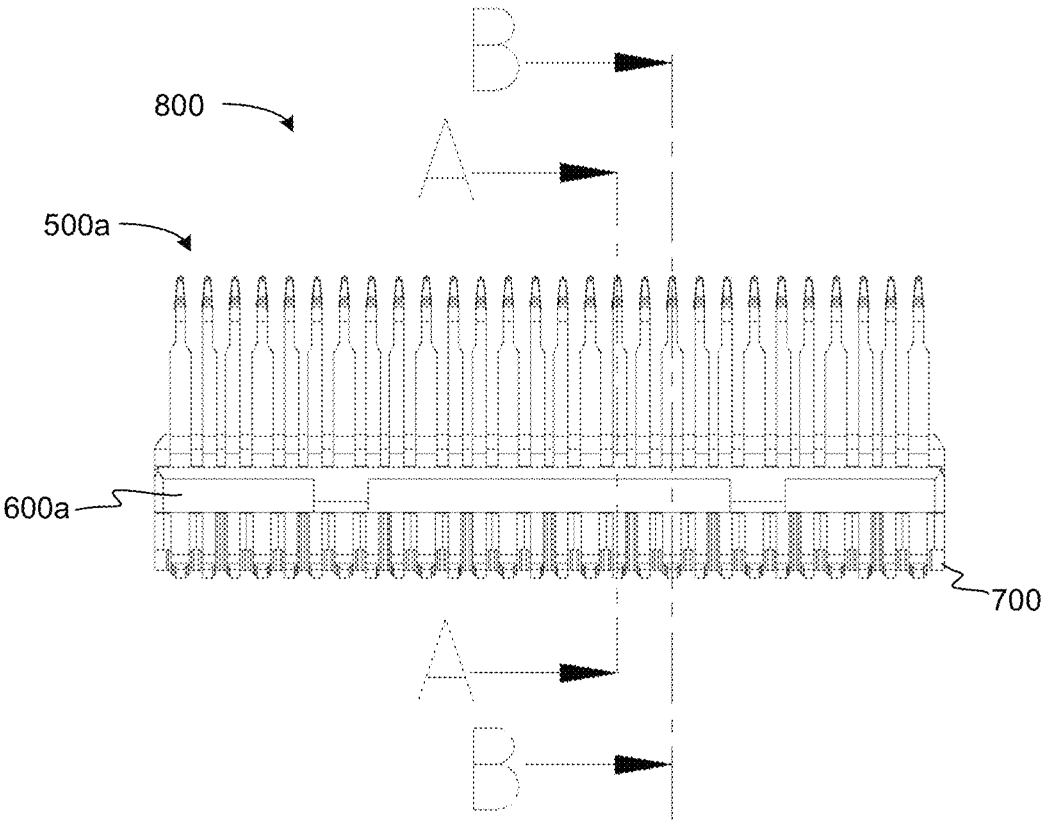
FIG. 8E is a front view of a sub-assembly including a spacer of FIGS. 7A-E and two rows of the conductors with overmolding of FIGS. 6A-E, according to some embodiments.
Figure 8F:
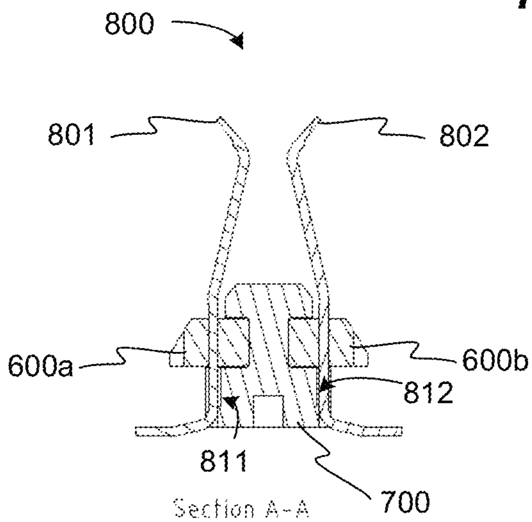
FIG. 8F is a cross-sectional view of a sub-assembly including a spacer of FIGS. 7A-E and two rows of the conductors with overmolding of FIGS. 6A-E, according to some embodiments. The cross-section is defined by the plane A-A shown in FIG. 8E.
Figure 8G:
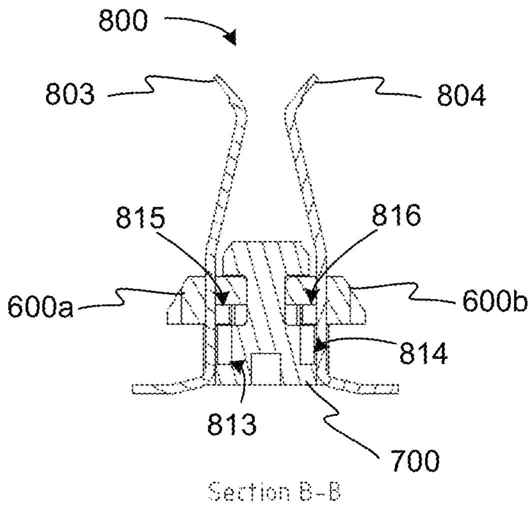
FIG. 8G is a cross-sectional view of a sub-assembly including a spacer of FIGS. 7A-E and two rows of the conductors with overmolding of FIGS. 6A-E, according to some embodiments. The cross-section is defined by the plane B-B shown in FIG. 8E.

In some embodiments, two rows 500 of conductors, each with an overmolding 600, may be assembled together with a spacer separating the two rows 500. FIG. 8A is a top view of a sub-assembly 800 including a spacer of 700 and two rows 500*a* and 500*b* of the conductors, each with an overmoldings 600*a* and 600*b*, respectively, according to some embodiments. FIG. 8B is a bottom view of the sub-assembly 800 including a spacer of 700 and two rows 500*a* and 500*b* of the conductors, each with overmoldings 600*a* and 600*b*, respectively, according to some embodiments. FIG. 8C is a side view of the sub-assembly 800 including a spacer of 700 and two rows 500*a* and 500*b* of the conductors, each with overmoldings 600*a* and 600*b*, respectively, according to some embodiments. FIG. 8D is a perspective view of the sub-assembly 800 including a spacer of 700 and two rows 500*a* and 500*b* of the conductors, each with overmoldings 600*a* and 600*b*, respectively, according to some embodiments. FIG. 8E is a front view of the sub-assembly 800 including a spacer 700 and two rows 500*a* and 500*b* of the conductors with overmoldings 600*a* and 600*b*, respectively, according to some embodiments. FIG. 8F is a cross-sectional view of the sub-assembly 800 including a spacer 700 and two rows 500*a* and 500*b* of the conductors with overmoldings 600*a* and 600*b*, respectively, according to some embodiments. The cross-section of FIG. 8F is defined by the plane A-A shown in FIG. 8E. FIG. 8G is a cross-sectional view of the sub-assembly 800 including a spacer 700 and two rows 500*a* and 500*b* of the conductors with overmoldings 600*a* and 600*b*, respectively, according to some embodiments. The cross-section of FIG. 8G is defined by the plane B-B shown in FIG. 8E.

As is shown in FIG. 8F, which illustrates a cross-section through a signal conductor 801 of the row 500*a* and signal conductor 802 of row 500*b*, openings 704 in the spacer 700 creates an air gap 811 between the signal conductor 801 and the spacer 700 and an air gap 812 between the signal conductor 802 and the spacer 700. In some embodiments, air gaps 811 and 812 may be less than 0.5 mm and greater than 0.01 mm, less than 0.4 mm and greater than 0.01 mm, less than 0.3 mm and greater than 0.01 mm, or less than 0.2 mm and greater than 0.01 mm. In some embodiments, the air gaps 811 and 812 reduce the crosstalk resonances between conductors.

As is shown in FIG. 8G, which illustrates a cross-section through a ground conductor 803 of the row 500*a* and a ground conductor 804 of row 500*b*, openings 703 in the spacer 700 creates an air gap 813 between the ground conductor 803 and the spacer 700 and an air gap 814 between the ground conductor 804 and the spacer 700. In some embodiments, air gaps 813 and 814 are greater than the air gaps 811 and 812. For example, the air gaps 813 and 814 may be greater than 0.5 mm. In some embodiments, the air gaps 813 and 814 reduce the crosstalk resonances between conductors.

Further shown in FIG. 8G is an air gap 815 between the ground conductor 803 and the overmolding 600*a* and an air gap 816 between the ground conductor 804 and the overmolding 600*b*. The air gaps 815 and 816 are created by the openings 603 formed in the overmoldings 600*a* and 600*b*.

Figure 9A:
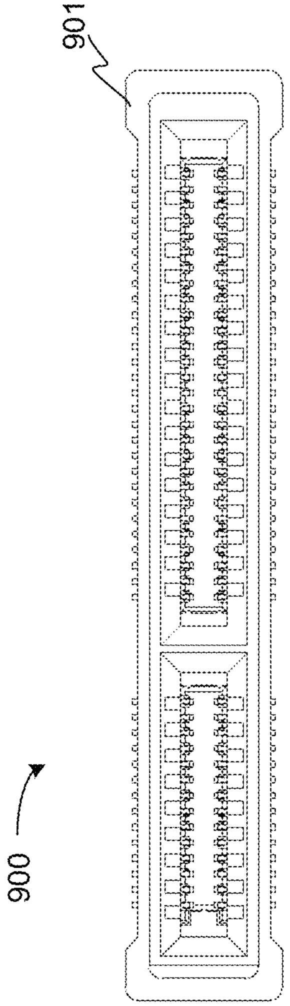
FIG. 9A is a top view of the vertical connector of FIG. 1, according to some embodiments.
Figure 9B:
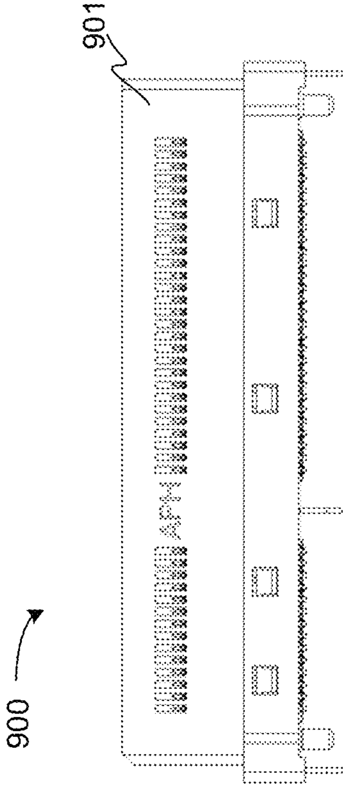
FIG. 9B is a front view of the vertical connector of FIG. 1, according to some embodiments.
Figure 9C:
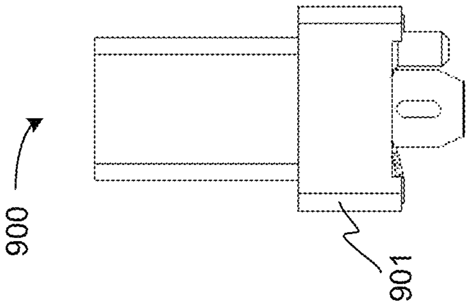
FIG. 9C is a side view of the vertical connector of FIG. 1, according to some embodiments.
Figure 9D:
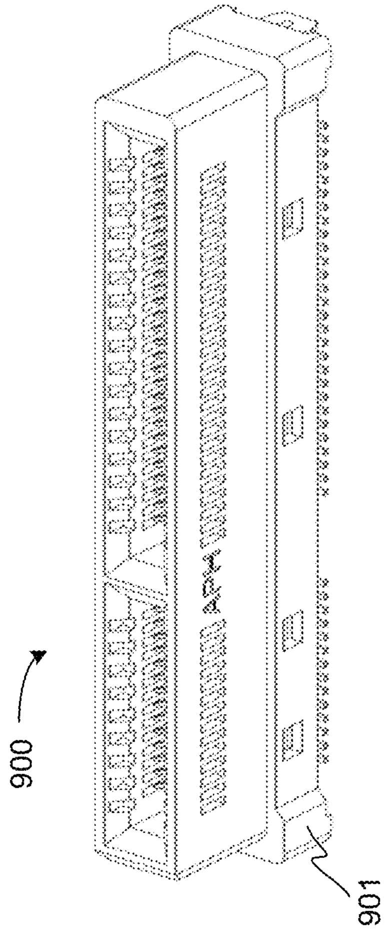
FIG. 9D is a perspective view of the vertical connector of FIG. 1, according to some embodiments.
Figure 9E:
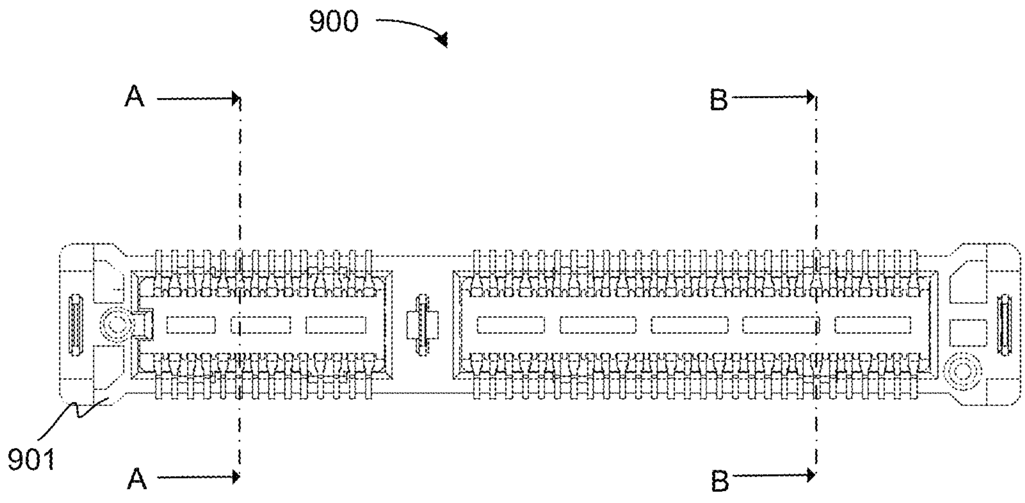
FIG. 9E is a bottom view of the vertical connector of FIG. 1, according to some embodiments.
Figure 9F:
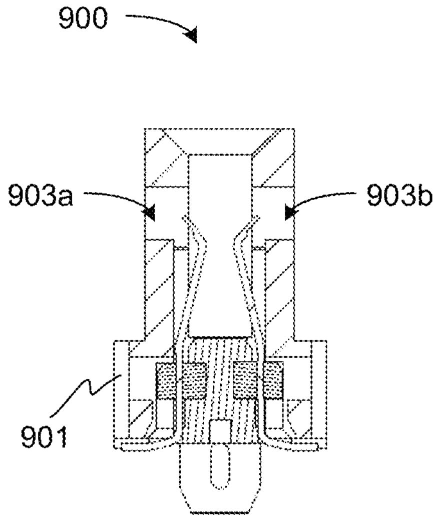
FIG. 9F is a cross-sectional view of the vertical connector of FIG. 1, according to some embodiments. The cross-section is defined by the plane A-A shown in FIG. 9E.
Figure 9G:
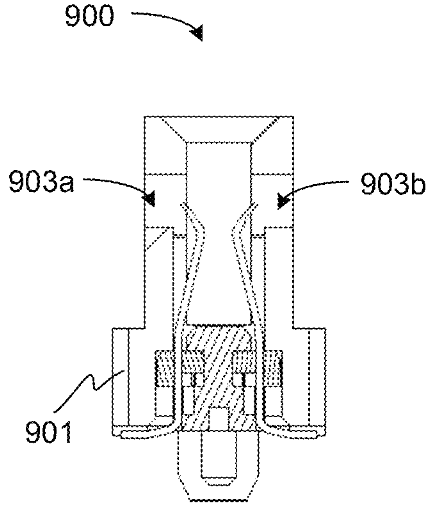
FIG. 9G is a cross-sectional view of the vertical connector 900, according to some embodiments. The cross-section is defined relative to the plane B-B shown in FIG. 9E.

In some embodiments, the sub-assembly 800 may be housed within a housing formed from an insulating material. FIG. 9A is a top view of a vertical connector 900 with 84 conductors, according to some embodiments. FIG. 9B is a front view of the vertical connector 900, according to some embodiments. FIG. 9C is a side view of the vertical connector 900, according to some embodiments. FIG. 9D is a perspective view of vertical connector 900, according to some embodiments. FIG. 9E is a bottom view of vertical connector 900, according to some embodiments. FIG. 9F is a cross-sectional view of vertical connector 900, according to some embodiments. The cross-section of FIG. 9F is defined by the plane A-A shown in FIG. 9E. FIG. 9G is a cross-sectional view of vertical connector 900, according to some embodiments. The cross-section of FIG. 9G is defined relative to the plane B-B shown in FIG. 9E.

The vertical connector 900 includes a housing 901, which includes at least one opening 905 that is configured to receive a PCB. In some embodiments, the opening 905 may include a slot that is bounded by a first wall of the housing and a second wall of the housing. The conductors may be aligned in rows along the first wall and the second wall of the housing.

The contact portion of the conductors are exposed within the at least one opening 905. The housing 901 includes channels 903*a* and 903*b* that are configured to receive the tip portion of a respective conductor. When a PCB is inserted into the vertical connector 900, a conductive portion of the PCB is placed in contact with a respective conductor. The PCB spreads the two rows of conductors apart, moving the tip portion of each conductor into the channels 903*a* and 903*b*. In some embodiments, the tail portions of the conductors extend from the housing 901. This may be useful, for example, for connecting the conductors to a PCB on which the vertical connector 900 is mounted.

The air gaps 811-816 are shown in FIGS. 9F and 9G, but are not labelled for the sake of clarity.

In some embodiments, an electrical connector may be a right-angle connector 200. Many of the features of the right-angle connector 200 are similar to the features described above for the vertical connector 100. Those features are shown in the drawings described below. Differences between the right-angle connector 200 and the vertical connector 100 are also discussed below.

In some embodiments, the two opposing rows of conductors of an electrical connector may have different overall shapes. For example, in a right-angle connector, a bottom row of conductors (e.g., the row of conductors with the contact portion nearer to the mother board than the other row of conductors) may have a body portion that is shorter than a top row of conductors (e.g., the row of conductors with the contact portion farther from the mother board than the other row of conductors).

Figure 10A:
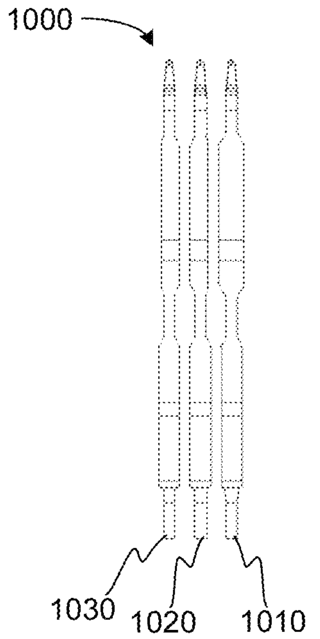
FIG. 10A is a front view of a group of three conductors that may be used in the right-angle connector of FIG. 2, according to some embodiments.
Figure 10D:
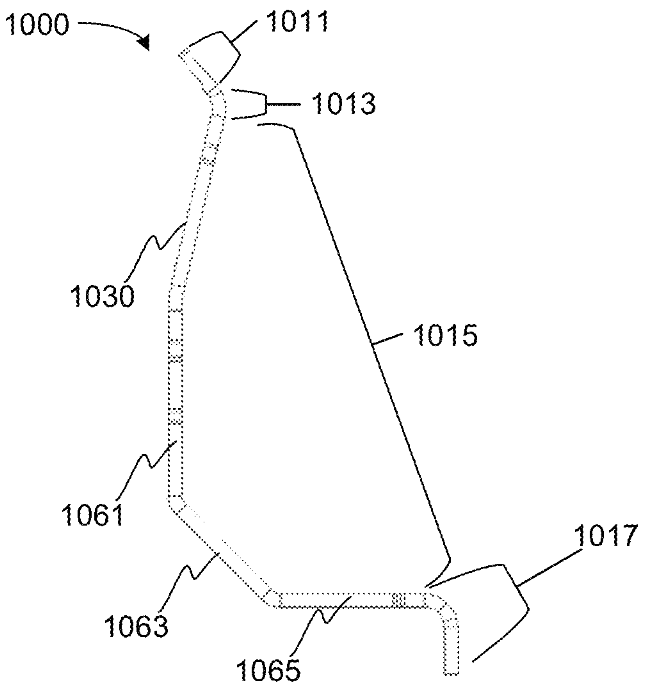
FIG. 10D is a side view of a group of three conductors that may be used in the right-angle connector of FIG. 2, according to some embodiments.
Figure 10B:
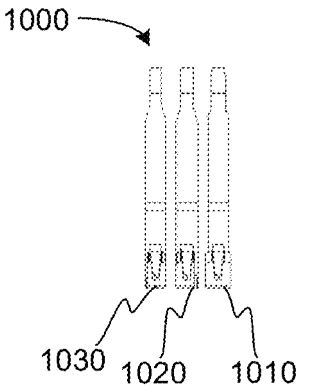
FIG. 10B is a top view of a group of three conductors that may be used in the right-angle connector of FIG. 2, according to some embodiments.
Figure 10C:
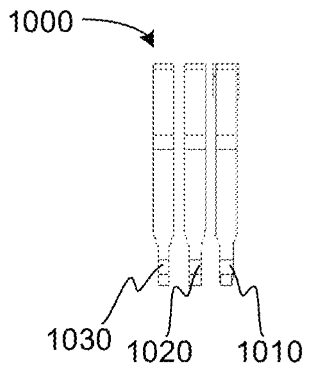
FIG. 10C is a bottom view of a group of three conductors that may be used in the right-angle connector of FIG. 2, according to some embodiments.
Figure 10E:
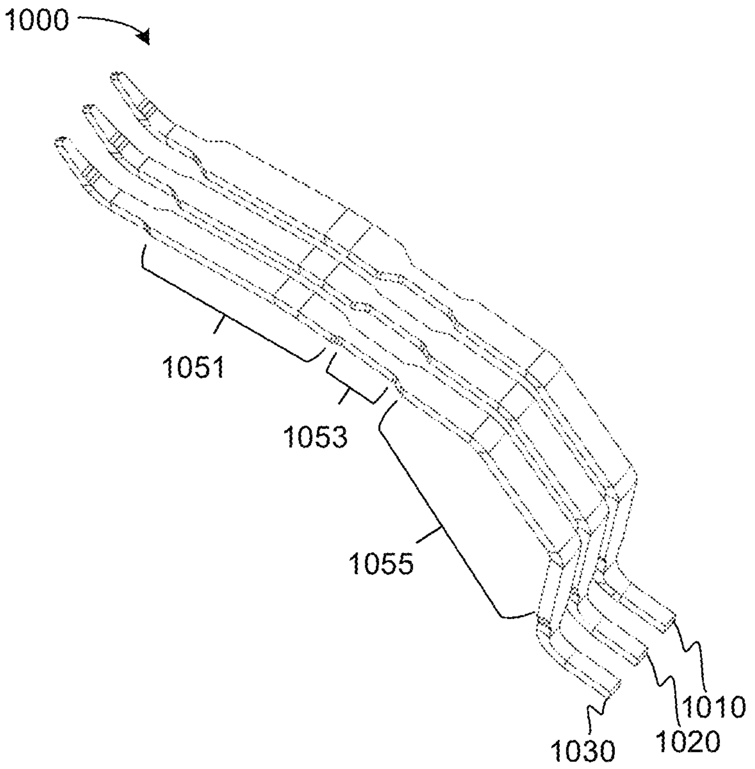
FIG. 10E is a perspective view of a group of three conductors that may be used in the right-angle connector of FIG. 2, according to some embodiments.

A single set of three conductors, referred to as a group of three conductors 1000, that may be used in a top row of conductors of the right-angle connector 200 is now described. FIG. 10A is a front view of the group of three conductors 1000 that may be used in the right-angle connector 200. FIG. 10B is a top view of the group of three conductors 1000 of conductors that may be used in the right-angle connector 200, according to some embodiments. FIG. 10C is a bottom view of the group of three conductors 1000 that may be used in the right-angle connector 200, according to some embodiments. FIG. 10D is a side view of the group of three conductors 1000 that may be used in the right-angle connector 200, according to some embodiments, though only signal conductor 1030 is visible because all three conductors have the same profile when viewed from the side. FIG. 3E is a perspective view of the group of three conductors 1000 that may be used in the right-angle connector 200.

The group of three conductors 1000 is configured to transfer a differential signal from a first electronic device to a second electronic device. The group of three conductors 1000 includes a ground conductor 1010, a first signal conductor 1020 and a second signal conductor 1030. Each conductor includes a tip portion 1011, a contact portion 1013, a body portion 1015 and a tail portion 1017. The body portion 1015 of each conductor may include one or more portions, including a first wide portion 1051, a second wide portion 1055, and a thin portion that is disposed between the first wide portion 1051 and the second wide portion 1055. In some embodiments, the first wide portion 1051 is shorter than the second wide portion 1055. The body portion 1015 may also include tapered portions that transition between the wide portions 1051 and 1055 and the thin portion 1053. In some embodiments, the second wide portion 1055 may include multiple sections that intersect at angles with one another. For example, a first section 1061 may be perpendicular to a third section 1065, with a second section 1063 positioned between the first section 1061 and the third section 1065. For example, the second section 1063 may intersect the first section 1061 and the third section 1065 at 45 degree angles.

Each conductor in the group of three conductors 1000 may have a different shape. In some embodiments, the first signal conductor 1020 and the second signal conductor 1030 may be minor images of one another. For example, a plane of symmetry may exist between the first signal conductor 1020 and the second signal conductor 1030. In some embodiments, the tapered portions of the body portions 1015 of the first signal conductor 1020 and the second signal conductor 1030 may be tapered on both sides, but in an asymmetric manner such that one side is more tapered than the other. In some embodiments, the first signal conductor 1020 and the second signal conductor 1030 may be positioned within the electrical connector 200 such that the less-tapered side of the body portion 1015 of the first signal conductor 1020 is on the side nearest the ground conductor 1010 and the less-tapered side of the body portion 1015 for the second signal conductor 1030 is on the side farthest from the ground conductor 1010. In other embodiments, not shown, the less-tapered sides of the first signal conductor 1020 and the second signal conductor may be both on the side nearest the ground conductor 1010, both on the side farthest from the ground conductor 1010, or the less-tapered side of the first signal conductor 1020 may be on the side farthest from the ground conductor 1010 and the less-tapered side of the second signal conductor 1030 may be on the side nearest to the ground conductor 1010.

The ground conductor 1010 may be a different shape from the two signal conductors 1020 and 1030. For example, the ground conductor 1010 may be symmetrical such that a plane of symmetry may bisect the ground conductor 1010 along a length of the ground conductor 1010. In some embodiments, the ground conductor 1010 may have a body portion 1015 that include tapered portions that are tapered on both sides of the ground conductor 1010 in equal amounts.

Figure 11:
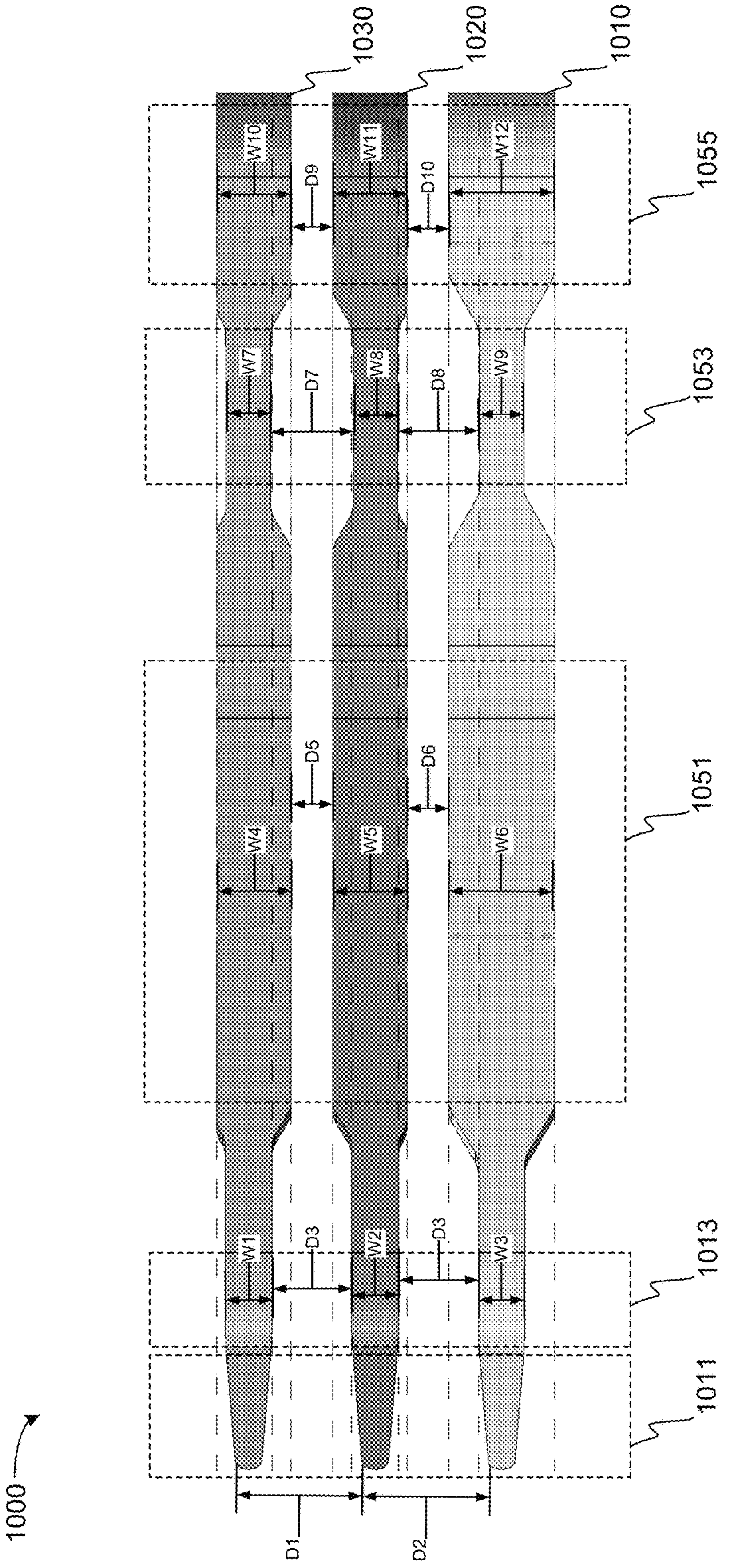
FIG. 11 is a front view of a group of three conductors that may be used in the right-angle connector of FIG. 2, according to some embodiments.

FIG. 11 is a front view of the group of three conductors 1000, similar to that illustrated in FIG. 10A, but rotated and including labels of various dimensions for the group of three conductors 1000. For example, distances D1 through D10 are labeled and widths W1 through W12 are labeled. The dashed boxes indicate the tip portion 1011, the contact portion 1013, the first wide portion 1051 of the body portion 1015, the thin portion 1053 of the body portion 1015, and the second wide portion 1055 of the body portion 1015. For the sake of clarity, not all of the second wide portion 1055 is shown. Instead, only an initial portion of the first section of the second wide portion 1055 is shown.

In some embodiments, the distance (D1) between the distal end of the tip portion 1011 of the first signal conductor 1020 and the distal end of the tip portion 1011 of the second signal conductor 1030 is equal to the distance (D2) between the distal end of the tip portion 1011 of the first signal conductor 1020 and the distal end of the tip portion 1011 of the ground conductor 1010. In some embodiments, the distance (D3) between the contact portion 1013 of the first signal conductor 1020 and the contact portion 1013 of the second signal conductor 1030 is equal to the distance (D4) between the contact portion 1013 of the first signal conductor 1020 and the contact portion 1013 of the ground conductor 1010. In some embodiments, the distances D3 and D4 are less than the distances D1 and D2. As a non-limiting example, D1 and D2 may be equal to 0.6 mm and D3 and D4 may be equal to mm. The pitch of the electrical connector is equal to the distance D1. Thus, in the example where D1 equals 0.6 mm, the electrical connector 100 may be referred to as a 0.6 mm right-angle edge connector.

In some embodiments, the distance (D5) between the first wide portion 1051 of the first signal conductor 1020 and the first wide portion 1051 of the second signal conductor 1030 may be equal to the distance (D6) between the first wide portion 1051 of the first signal conductor 1020 and the first wide portion 1051 of the ground conductor 1010. As a non-limiting example, D5 and D6 may be equal to 0.20 mm. In some embodiments, the distance (D9) between the second wide portion 1055 of the first signal conductor 1020 and the second wide portion 1055 of the second signal conductor 1030 may be equal to the distance (D10) between the second wide portion 1055 of the first signal conductor 1020 and the second wide portion 1055 of the ground conductor 1010. For example, D9 and D10 may be equal to 0.20 mm. In some embodiments, such as in the example measurements provided above the following conditions may be satisfied: D5=D6=D9=D10. In some embodiments, the distance (D7) between the thin portion 1053 of the first signal conductor 1020 and the thin portion 1053 of the second signal conductor 1030 may be equal to the distance (D8) between the thin portion 1053 of the first signal conductor 1020 and the thin portion 1053 of the ground conductor 1010. In some embodiments, D7 and D8 are greater than D5 and D6.

In some embodiments, the width (W2) of the contact portion 1013 of the first signal conductor 1020, the width (W1) of the contact portion 1013 of the second signal conductor 1030, and the width (W3) of the contact portion 1013 of the ground conductor 1010 are equal. In some embodiments, the width (W5) of the first wide portion 1051 of the first signal conductor 1020, the width (W4) of the first wide portion 1051 of the second signal conductor 1030 are equal and less than or equal to the width (W6) of the first wide portion 1051 of the ground conductor 1010. In a non-limiting example, W4=W5=0.35 mm and W6=0.50 mm. In some embodiments, the width (W11) of the second wide portion 1055 of the first signal conductor 1020, the width (W10) of the second wide portion 1055 of the second signal conductor 1030 are equal and less than or equal to the width (W12) of the second wide portion 1055 of the ground conductor 1010. In a non-limiting example, W10=W11=0.35 mm and W6=0.50 mm in the lower row contacts, W10=W11=W12=0.4 mm in the upper row contacts for better impedance. In some embodiments, W10 is equal to W4, W11 is equal to W5, and W12 is equal to W6. In some embodiments, W12 is greater than W4 and W5. In some embodiments, the width (W8) of the thin portion 1053 of the first signal conductor 1020, the width (W7) of the thin portion 1053 of the second signal conductor 1030, and the width (W9) of the thin portion 1053 of the ground conductor 1010 are equal.

In some embodiments, e.g., the embodiment illustrated in FIG. 11, the uniform width of each of the conductors of the group of three conductors 1000 in the first wide portion 1051, the thin portion 1053, and the second wide portion 1055 may reduce the crosstalk resonance between conductors. Furthermore, in some embodiments, the tapered tip portion 1011 of each conductor of the group of three conductors 1000 may increase the impedance at a mating interface of the electrical connector 100 and reduce the resonance peak at high frequencies (e.g., above 20 GHz) as compared to untampered tip portions.

Figure 12D:
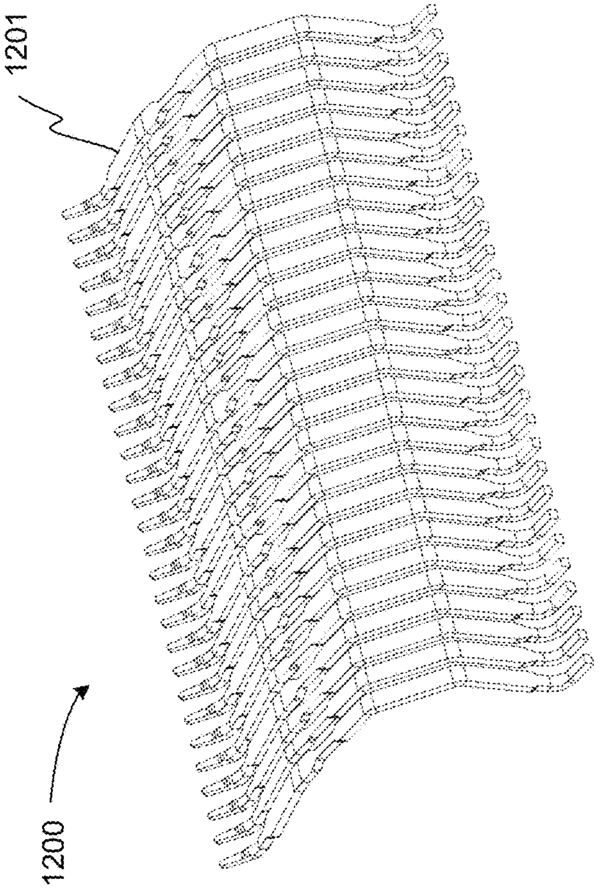
FIG. 12D is a perspective view of a row of conductors formed from seven groups of three conductors of FIGS. 10A-E and an additional ground conductor that may be used in the right-angle connector of FIG. 2, according to some embodiments.
Figure 12A:
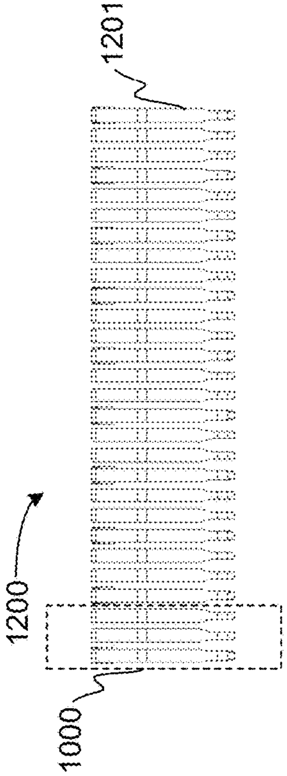
FIG. 12A is a bottom view of a row of conductors formed from seven groups of three conductors of FIGS. 10A-E and an additional ground conductor that may be used in the right-angle connector of FIG. 2, according to some embodiments.
Figure 12B:
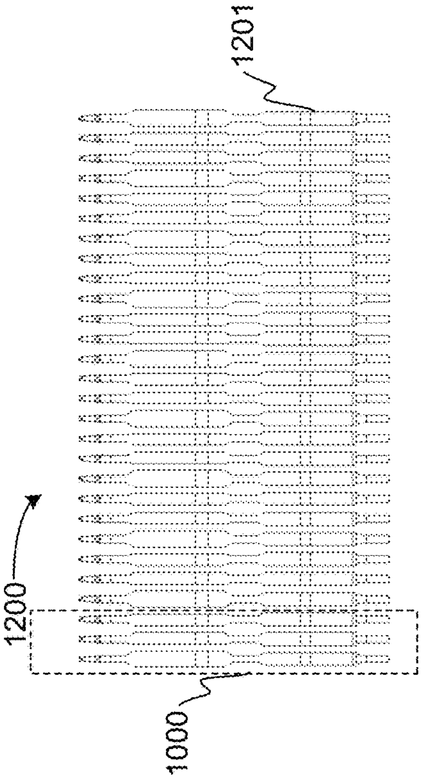
FIG. 12B is a front view of a row of conductors formed from seven groups of three conductors of FIGS. 10A-E and an additional ground conductor that may be used in the right-angle connector of FIG. 2, according to some embodiments.
Figure 12C:
FIG. 12C is a top view of a row of conductors formed from seven groups of three conductors of FIGS. 10A-E and an additional ground conductor that may be used in the right-angle connector of FIG. 2, according to some embodiments.

In some embodiments, multiple groups of three conductors 1000 may be arranged to form a top row of conductors. FIG. 12A is a bottom view of a top row 1200 of conductors formed from seven groups of three conductors and an additional ground conductor 1201, according to some embodiments. FIG. 12B is a front view of the top row 1200 of conductors formed from seven groups of three conductors and the additional ground conductor 1201, according to some embodiments. FIG. 12C is a top view of the top row 1200 of conductors formed from seven groups of three conductors and the additional ground conductor 1201, according to some embodiments. FIG. 12D is a perspective view of the top row 1200 of conductors formed from seven groups of three conductors and the additional ground conductor 1201, according to some embodiments.

The top row 1200 of conductors includes multiple groups of three conductors 1000, each group of three conductors 1000 including a ground conductor 1010, a first signal conductor 1020, and a second signal conductor 1030. Any number of groups of three conductors may be included. In the example shown in FIGS. 12A-D, the top row 1200 includes seven groups of three conductors. In some embodiments, additional conductors that are not part of a group of three conductors 1000 may be included. For example, an extra ground conductor 1201 may be included in the top row 1200.

In some embodiments, the groups of three conductors 1000 are positioned such that the tip portion of each conductor in the top row 1200 is the same distance from the tip portion of each adjacent conductor. For example, if the pitch of tip portions of the conductors within a single group of three conductors 1000 is 0.6 mm, then the pitch between the tip portion of the conductor from an immediately adjacent group of three conductors 1000 is also 0.6 mm.

Figure 13A:
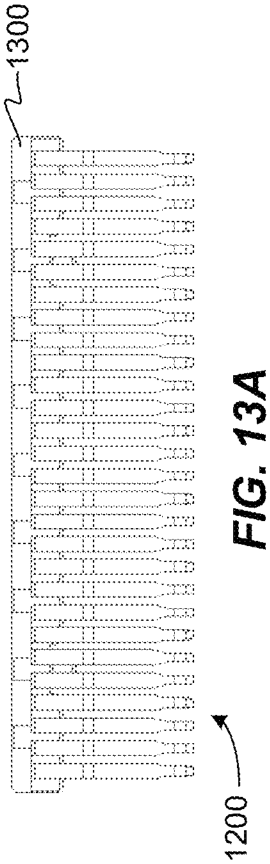
FIG. 13A is a bottom view of a row of conductors of FIGS. 12A-D with overmolding that may be used in the right-angle connector of FIG. 2, according to some embodiments.
Figure 13B:
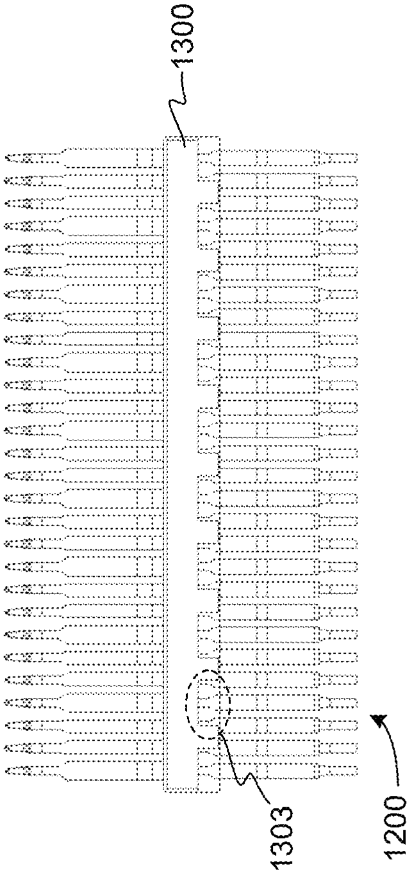
FIG. 13B is a front view of a row of conductors of FIGS. 12A-D with overmolding that may be used in the right-angle connector of FIG. 2, according to some embodiments.
Figure 13C:
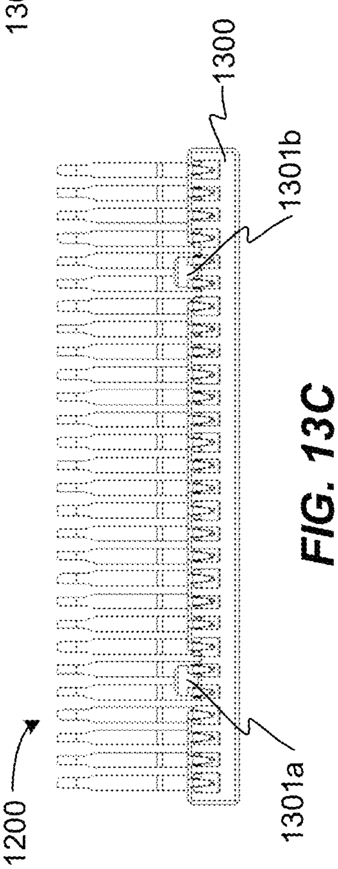
FIG. 13C is a top view of a row of conductors of FIGS. 12A-D with overmolding that may be used in the right-angle connector of FIG. 2, according to some embodiments.
Figure 13D:
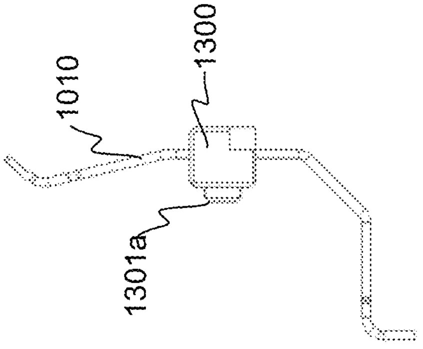
FIG. 13D is a side view of a row of conductors of FIGS. 12A-D with overmolding that may be used in the right-angle connector of FIG. 2, according to some embodiments.
Figure 13E:
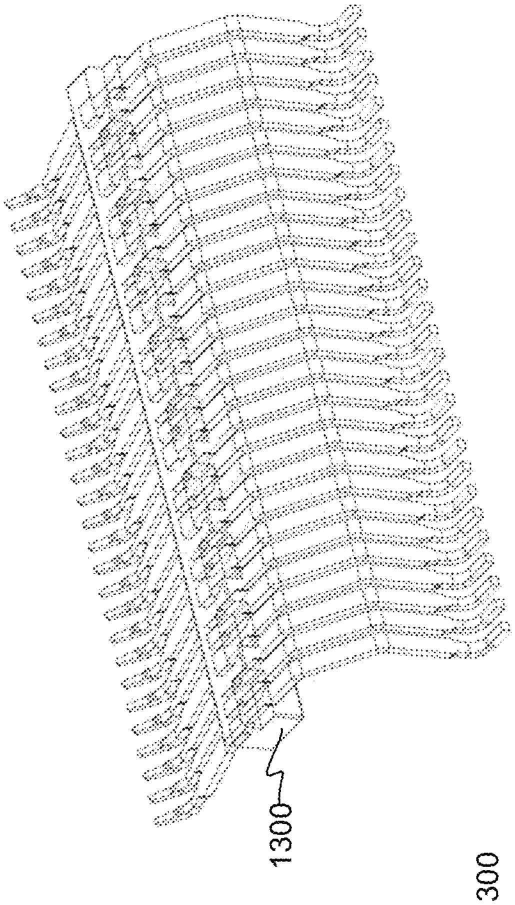
FIG. 13E is a perspective view of a row of conductors of FIGS. 12A-D with overmolding that may be used in the right-angle connector of FIG. 2, according to some embodiments.

To hold the conductors in the top row 1200 in position relative to one another, an overmolding 1300 is formed using an insulating material. FIG. 13A is a bottom view of the top row 1200 of conductors with an overmolding 1300, according to some embodiments. FIG. 13B is a front view of the top row 1200 of conductors with the overmolding 1300, according to some embodiments. FIG. 13C is a top view of the top row 1200 of conductors with the overmolding 1300, according to some embodiments. FIG. 13D is a side view of the top row 1200 of conductors with the overmolding 1300, according to some embodiments, though only one ground conductor 1010 is visible because all the conductors in the top row 1200 have the same profile when viewed from the side. FIG. 13E is a perspective view of the top row 1200 of conductors with the overmolding 1300, according to some embodiments.

In some embodiments, the overmolding 1300 is disposed over the thin portion 1053 of the body portion 1015 of each conductor. One or more openings 1303 may be formed in the overmolding 1300 to expose portions of the conductors in top row 1200 to air. By exposing different portions of the conductors to different materials (e.g., air versus the insulating material of the overmolding), the electrical properties of the electrical connector can be controlled. In some embodiments, an opening 1303 is formed in the overmolding between the ground conductors of the top row 1200 and the first signal conductors. As a result, a portion of the ground conductors and a portion of the first signal conductors are exposed to air. As shown in FIGS. 13A-E, the opening 1303 is a slot that extends from the side of the overmolding 1300 nearest the tail portion of the ground conductor to the approximately the middle of the overmolding 1300. Embodiments are not limited to forming the opening 1303 over the ground conductors. For example, the openings 1303 may be formed over the ground conductor 1010 of each group of three conductors 1000 such that at least a portion of the ground conductor 1010 and at least a portion of the first signal conductor 1020 is exposed to air. In some embodiments, introducing openings 1303 in the overmolding 1300 may reduce one or more resonances between the conductors.

In some embodiments, the overmolding 1300 includes one or more protrusions configured to be inserted into a groove or hole on another portion of the electrical connector, such as the spacer discussed below. For example, in FIGS. 13A-E, the overmolding 1300 includes a first protrusion 1301*a* and a second protrusion 1301*b*, the protrusions being cylindrical in shape and protruding from the overmolding in a direction perpendicular to a direction in which the row 1200 is aligned.

Figure 14A:
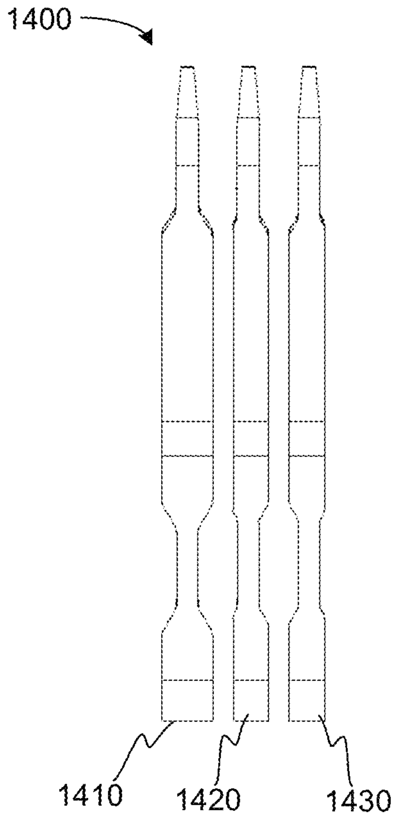
FIG. 14A is a front view of the group of three conductors that may be used in the right-angle connector of FIG. 2.
Figure 14C:
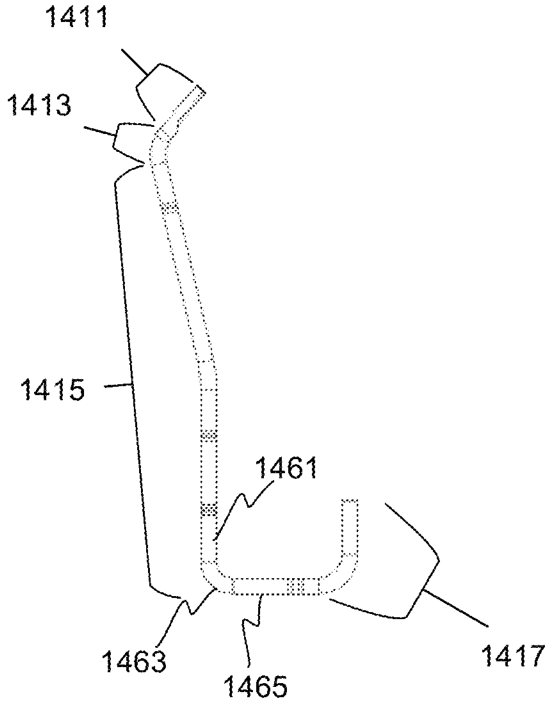
FIG. 14C is a side view of the group of three conductors that may be used in the right-angle connector of FIG. 2, according to some embodiments.
Figure 14B:
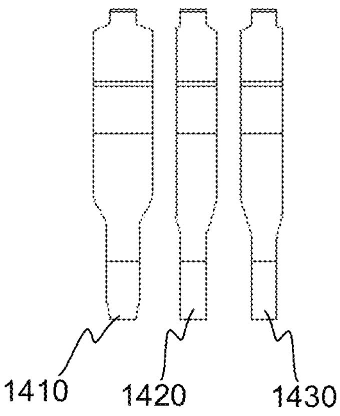
FIG. 14B is a bottom view of the group of three conductors that may be used in the right-angle connector of FIG. 2, according to some embodiments.
Figure 14D:
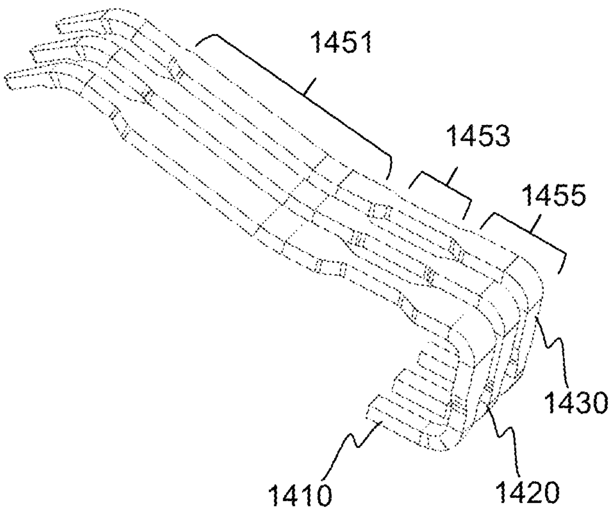
FIG. 14D is a perspective view of the group of three conductors that may be used in the right-angle connector of FIG. 2, according to some embodiments.

A single set of three conductors, referred to as a group of three conductors 1400, that may be used in a bottom row of conductors of the right-angle connector 200 is now described. FIG. 14A is a front view of the group of three conductors 1400 that may be used in the right-angle connector 200. FIG. 14B is a bottom view of the group of three conductors 1400 that may be used in the right-angle connector 200, according to some embodiments. FIG. 14C is a side view of the group of three conductors 1400 that may be used in the right-angle connector 200, according to some embodiments, though only signal conductor 1430 is visible because all three conductors have the same profile when viewed from the side. FIG. 14D is a perspective view of the group of three conductors 1400 that may be used in the right-angle connector 200, according to some embodiments.

The group of three conductors 1400 is configured to transfer a differential signal from a first electronic device to a second electronic device. The group of three conductors 1400 includes a ground conductor 1410, a first signal conductor 1420 and a second signal conductor 1430. Each conductor includes a tip portion 1411, a contact portion 1413, a body portion 1415 and a tail portion 1417. The body portion 1415 of each conductor may include one or more portions, including a first wide portion 1451, a second wide portion 1455, and a thin portion that is disposed between the first wide portion 1451 and the second wide portion 1455. In some embodiments, the first wide portion 1451 is longer than the second wide portion 1455. The body portion 1415 may also include tapered portions that transition between the wide portions 1451 and 1455 and the thin portion 1453. In some embodiments, the second wide portion 1455 may include multiple sections that intersect at angles with one another. For example, a first section 1461 may be perpendicular to a third section 1465, with a second section 1463 positioned between the first section 1461 and the second section 1465. For example, the second section 1063 may be curved such that the intersection with the first section 1061 and the intersection with the third section 1065 are straight (180 degree angles).

Each conductor in the group of three conductors 1400 may have a different shape. In some embodiments, the first signal conductor 1420 and the second signal conductor 1430 may be minor images of one another. For example, a plane of symmetry may exist between the first signal conductor 1420 and the second signal conductor 1430. In some embodiments, the tapered portions of the body portions 1415 of the first signal conductor 1420 and the second signal conductor 1430 may be tapered on both sides, but in an asymmetric manner such that one side is more tapered than the other. In some embodiments, the first signal conductor 1420 and the second signal conductor 1430 may be positioned within the electrical connector 200 such that the less-tapered side of the body portion 1415 of the first signal conductor 1420 is on the side nearest the ground conductor 1410 and the less-tapered side of the body portion 1415 for the second signal conductor 1430 is on the side farthest from the ground conductor 1410. In other embodiments, not shown, the less-tapered sides of the first signal conductor 1420 and the second signal conductor may be both on the side nearest the ground conductor 1410, both on the side farthest from the ground conductor 1410, or the less-tapered side of the first signal conductor 1420 may be on the side farthest from the ground conductor 1410 and the less-tapered side of the second signal conductor 1430 may be on the side nearest to the ground conductor 1410.

The ground conductor 1410 may be a different shape from the two signal conductors 1420 and 1430. For example, the ground conductor 1410 may be symmetrical such that a plane of symmetry may bisect the ground conductor 1410 along a length of the ground conductor 1410. In some embodiments, the ground conductor 1410 may have a body portion 1415 that include tapered portions that are tapered on both sides of the ground conductor 1410 in equal amounts.

The distances between the conductors and the widths of the conductors of the group of three conductors 1400 used in a bottom row of conductors are similar to those of the group of three conductors 1000 used in the top row of conductors and described in FIG. 11. In some embodiments, the uniform width of each of the conductors of the group of three conductors 1400 in the first wide portion 1451, the thin portion 1453, and the second wide portion 1455 may reduce the crosstalk resonance between conductors. Furthermore, in some embodiments, the tapered tip portion 1411 of each conductor of the group of three conductors 1400 may increase the impedance at a mating interface of the electrical connector 200 and reduce the resonance peak at high frequencies (e.g., above 20 GHz) as compared to untampered tip portions.

Figure 15D:
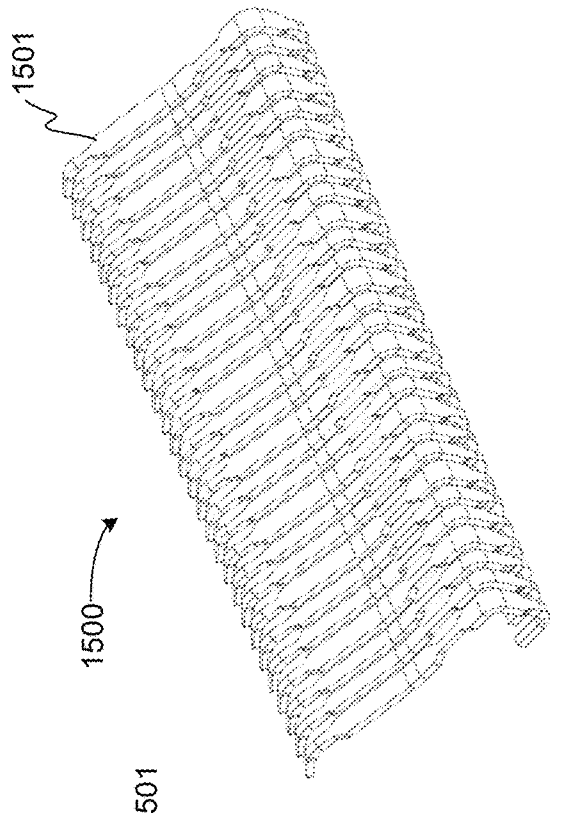
FIG. 15D is a perspective view of the top row of conductors formed from seven groups of three conductors of FIGS. 14A-D and an additional ground conductor, according to some embodiments.
Figure 15A:
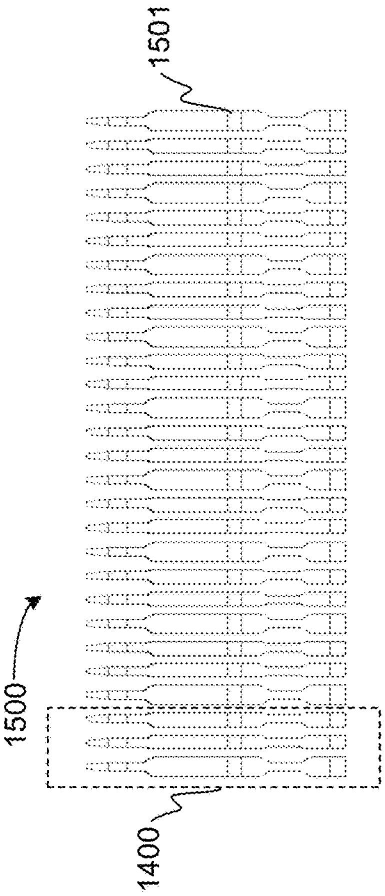
FIG. 15A is a front view of a top row of conductors formed from seven groups of three conductors of FIGS. 14A-D and an additional ground conductor, according to some embodiments.
Figure 15B:
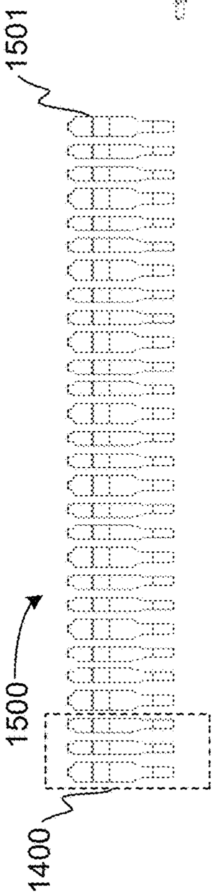
FIG. 15B is a bottom view of the top row of conductors formed from seven groups of three conductors of FIGS. 14A-D and an additional ground conductor, according to some embodiments.
Figure 15C:
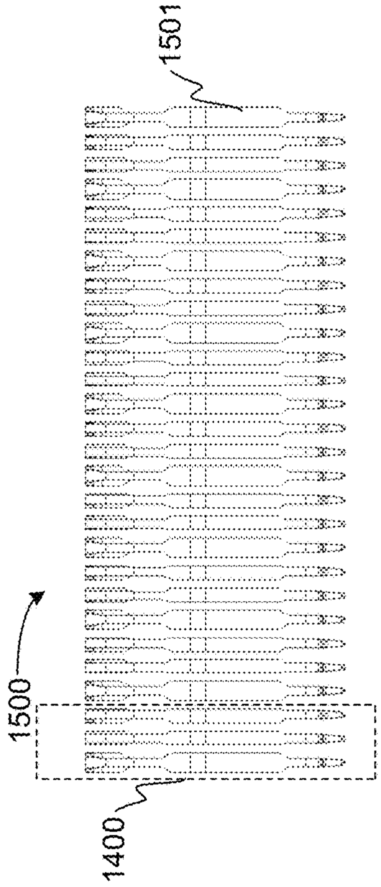
FIG. 15C is a back view of the top row of conductors formed from seven groups of three conductors of FIGS. 14A-D and an additional ground conductor, according to some embodiments.

In some embodiments, multiple groups of three conductors 1400 may be arranged to form a bottom row of conductors. FIG. 15A is a front view of a bottom row 1500 of conductors formed from seven groups of three conductors 1400 and an additional ground conductor 1501, according to some embodiments. FIG. 15B is a bottom view of the bottom row 1500 of conductors formed from seven groups of three conductors 1400 and the additional ground conductor 1501, according to some embodiments. FIG. 15C is a back view of the bottom row 1500 of conductors formed from seven groups of three conductors 1400 and the additional ground conductor 1501, according to some embodiments. FIG. 15D is a perspective view of the bottom row 1500 of conductors formed from seven groups of three conductors 1400 and the additional ground conductor 1501, according to some embodiments.

The bottom row 1500 of conductors includes multiple groups of three conductors 1400, each group of three conductors 1400 including a ground conductor 1410, a first signal conductor 1420, and a second signal conductor 1430. Any number of groups of three conductors may be included. In the example shown in FIGS. 15A-D, the bottom row 1500 includes seven groups of three conductors. In some embodiments, additional conductors that are not part of a group of three conductors 1500 may be included. For example, an extra ground conductor 1501 may be included in the bottom row 1500.

In some embodiments, the groups of three conductors 1400 are positioned such that the tip portion of each conductor in the bottom row 1500 is the same distance from the tip portion of each adjacent conductor. For example, if the pitch of tip portions of the conductors within a single group of three conductors 1400 is 0.6 mm, then the pitch between the tip portion of the conductor from an immediately adjacent group of three conductors 1400 is also 0.6 mm.

Figure 16A:
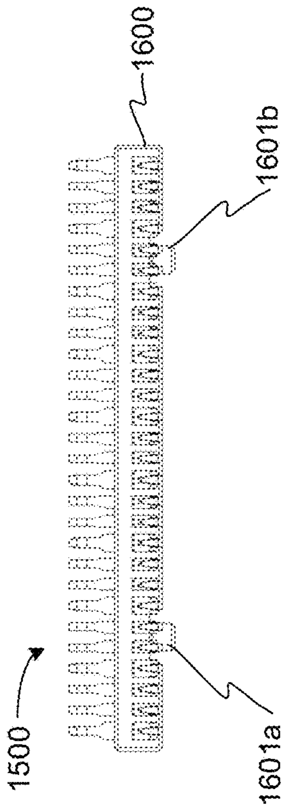
FIG. 16A is a top view of the bottom row of conductors of FIGS. 15A-D with an overmolding, according to some embodiments.
Figure 16B:
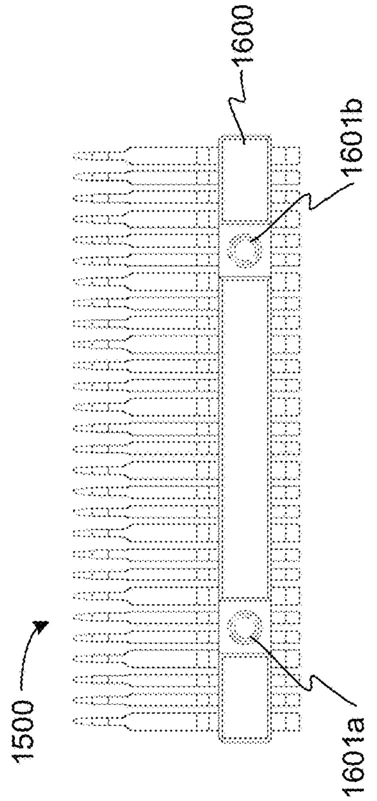
FIG. 16B is a front view of the bottom row of conductors of FIGS. 15A-D with the overmolding, according to some embodiments.
Figure 16C:
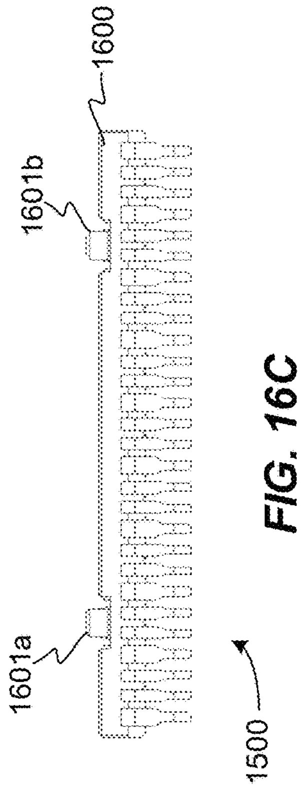
FIG. 16C is a bottom view of the bottom row of conductors of FIGS. 15A-D with the overmolding, according to some embodiments.
Figure 16D:
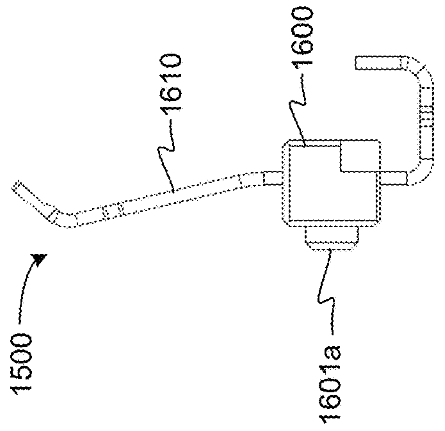
FIG. 16D is a side view of the bottom row of conductors of FIGS. 15A-D with the overmolding, according to some embodiments.
Figure 16E:
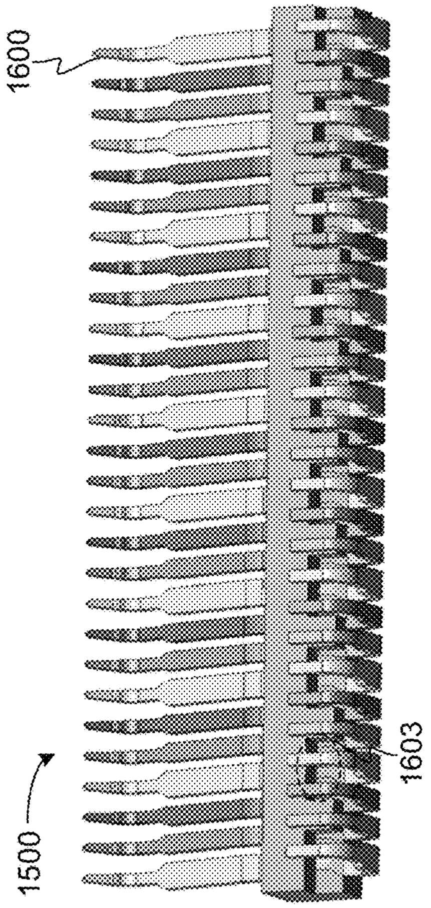
FIG. 16E is a perspective view of the bottom row of conductors of FIGS. 15A-D with the overmolding, according to some embodiments.

To hold the conductors in the bottom row 1500 in position relative to one another, an overmolding 1600 is formed using an insulating material. FIG. 16A is a top view of the bottom row 1500 of conductors with an overmolding 1600, according to some embodiments. FIG. 16B is a front view of the bottom row 1500 of conductors with the overmolding 1600, according to some embodiments. FIG. 16C is a bottom view of the bottom row 1500 of conductors with the overmolding 1600, according to some embodiments. FIG. 16D is a side view of the bottom row 1500 of conductors with the overmolding 1600, according to some embodiments, though only one ground conductor 1610 is visible because all the conductors in the bottom row 1500 have the same profile when viewed from the side. FIG. 16E is a perspective view of the bottom row 1500 of conductors with the overmolding 1600, according to some embodiments.

In some embodiments, the overmolding 1600 is disposed over the thin portion 1453 of the body portion 1415 of each conductor. One or more openings 1603 may be formed in the overmolding 1600 to expose portions of the conductors in bottom row 1500 to air. By exposing different portions of the conductors to different materials (e.g., air versus the insulating material of the overmolding), the electrical properties of the electrical connector can be controlled. In some embodiments, an opening 1603 is formed in the overmolding between the ground conductors of the bottom row 1500 and the first signal conductors. As a result, a portion of the ground conductors and a portion of the first signal conductors are exposed to air. As shown in FIGS. 16A-E, the opening 1603 is a slot that extends from the side of the overmolding 1600 nearest the tail portion of the ground conductor to the approximately the middle of the overmolding 1600. Embodiments are not limited to forming the opening 1603 over the ground conductors. For example, the openings 1603 may be formed over the ground conductor 1410 of each group of three conductors 1400 such that at least a portion of the ground conductor 1410 and at least a portion of the first signal conductor 1420 is exposed to air. In some embodiments, introducing openings 1603 in the overmolding 1600 may reduce one or more resonances between the conductors.

In some embodiments, the overmolding 1600 includes one or more protrusions configured to be inserted into a groove or hole on another portion of the electrical connector, such as the spacer discussed below. For example, in FIGS. 16A-E, the overmolding 1600 includes a first protrusion 1601*a* and a second protrusion 1601*b*, the protrusions being cylindrical in shape and protruding from the overmolding in a direction perpendicular to a direction in which the row 1500 is aligned.

Figure 17A:
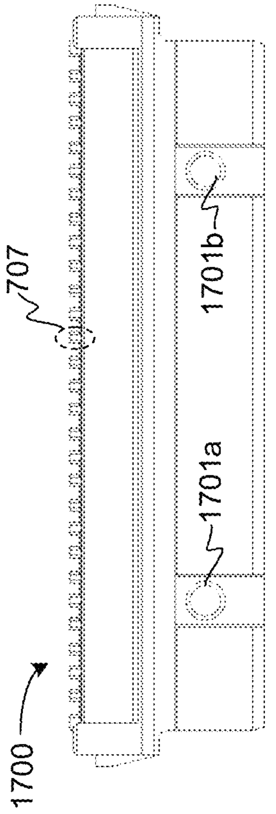
FIG. 17A is a top view of a spacer that may be used in electrical connector of FIG. 2, according to some embodiments.
Figure 17B:
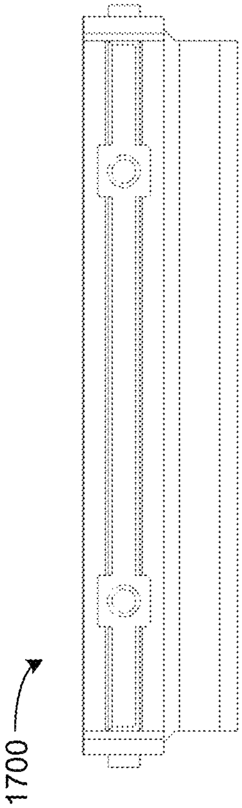
FIG. 17B is a front view of a spacer that may be used in electrical connector of FIG. 2, according to some embodiments.
Figure 17C:
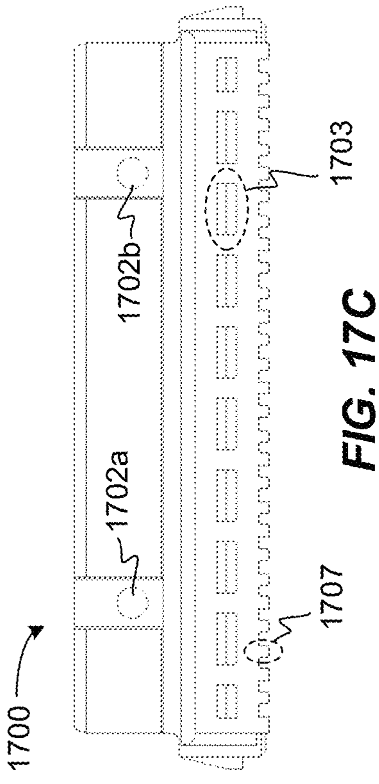
FIG. 17C is a bottom view of the spacer that may be used in electrical connector of FIG. 2, according to some embodiments.
Figure 17D:
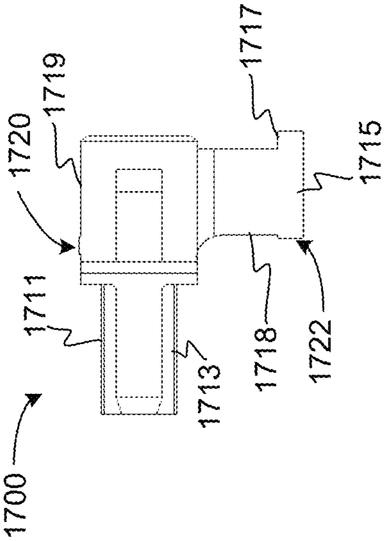
FIG. 17D is a side view of the spacer that may be used in electrical connector of FIG. 2, according to some embodiments.
Figure 17E:
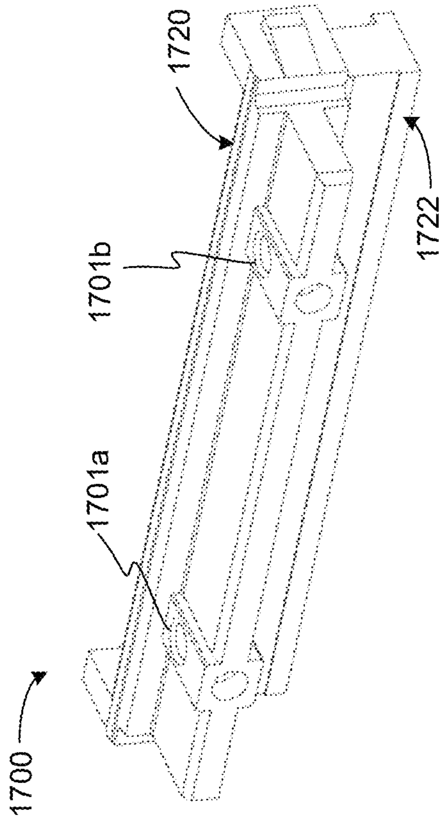
FIG. 17E is a perspective view of the spacer that may be used in electrical connector of FIG. 2, according to some embodiments.

A spacer may be used to separate the top row of conductors and the bottom row of conductors and hold the two rows in position relative to one another. In some embodiments, the spacer is formed from an insulating material. For example, the spacer may be formed via injection molding using a plastic material. FIG. 17A is a top view of a spacer 1700 that may be used in electrical connector 200, according to some embodiments. FIG. 17B is a front view of the spacer 1700 that may be used in electrical connector 200, according to some embodiments. FIG. 17C is a bottom view of the spacer 1700 that may be used in electrical connector 200, according to some embodiments. FIG. 17D is a side view of the spacer 1700 that may be used in electrical connector 200, according to some embodiments. FIG. 17E is a perspective view of the spacer 1700 that may be used in electrical connector 200, according to some embodiments.

In some embodiments, the spacer 1700 includes one or more grooves or holes configured to receive the protrusions included on the overmolding of the rows of conductors. For example, a first hole 1701*a* formed in a top surface 1711 of the spacer 1700 may receive the second protrusion 1301*b* of the overmolding 1300 of the top row 1200 and a second hole 1701*b* formed in the top surface 1711 of the spacer 1700 may receive the first protrusion 1301*a* of the overmolding 1300. A third hole 1702*a* formed in a bottom surface 1713 of the spacer 1700 may receive the first protrusion 1601*a* of the overmolding 1600 of the bottom row 1500 and a fourth hole 1702*b* formed in the bottom surface 1713 of the spacer 1700 may receive the second protrusion 1601*b* of the overmolding 1600.

In some embodiments, the openings 1701*a-b* and 1702*a-b* are formed in a portion of the spacer that is not above the base surface 1715 of spacer 1700. Instead, the openings 1701*a-b* and 1702*a-b* are formed in a horizontal portion of the spacer 1700 that includes surfaces 1711 and 1713 and protrudes horizontally from a vertical portion of the spacer 1700 that includes the base surface 1715. The base surface of the spacer 1700 is configured to interface with an electronic component, such as a PCB, on which the electrical connector may be mounted.

In some embodiments, the spacer 1700 includes openings 1703 in the vertical portion of the spacer 1700 such that when the top row 1200 and bottom row 1500 are in place, the openings 1703 are between the conductors of the top row 1200 and the conductors of the bottom row 1500. In some embodiments, the openings 1703 are centered in a position that corresponds with the ground conductors of the two rows 1200 and 1500. In some embodiments, the openings 1703 have a width such that the opening extends to a position that overlaps, at least partially, with the position of the signal conductors of the two rows 1200 and 1500. In some embodiments, the openings 1703 may be a hole (e.g., a blind hole).

In some embodiments, the spacer 1700 includes multiple ribs 1707 to hold the individual conductors of the top row 1200 of conductors in place relative to each other and relative to the spacer. For example, the ribs 1707 may extend from the base surface 1715 of the spacer 1700 to the level 1717. In some embodiments, there are also ribs on the opposite side of the vertical portion of the spacer 1700 configured to hold the individual conductors of the bottom row 1500 of conductors.

In some embodiments, the spacer 1700 includes one or more protrusions configured to make physical contact with the conductors of the top row 1200 and the bottom row 1500. By contacting the conductors with a protrusion, other portions of the spacer 1700 are kept from making physical contact with the conductors. In this way, an air gap may be formed around portions of the conductors. In some embodiments, a top protrusion 1720 is formed on a top surface 1719 of the spacer 1700. The top protrusion 1720 is configured to make physical contact with the top row 1200 of conductors. In some embodiments, a bottom protrusion 1722 is formed on a vertical surface 1718 of the spacer 1700. The bottom protrusion 1722 is configured to make physical contact with the bottom row 1500 of conductors.

In some embodiments, the openings 1703 and the air gaps created using the protrusions 1720 and 1722 may reduce the crosstalk between conductors of the electrical connector 200.

Figure 18A:
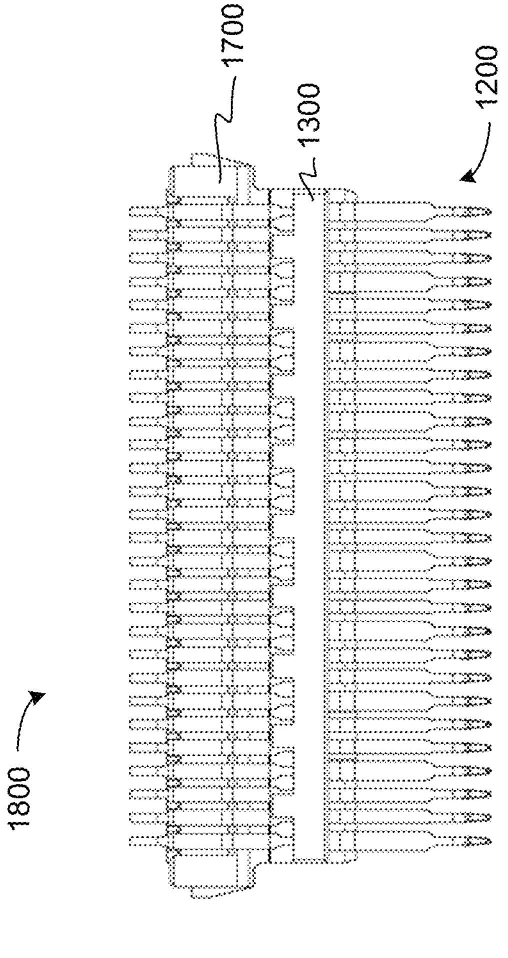
FIG. 18A is a top view of a sub-assembly including a spacer of FIGS. 17A-E, the top row of conductors with the overmolding of FIGS. 13A-E, the bottom row of conductors with the overmolding of FIG. 16A-E, according to some embodiments.
Figure 18B:
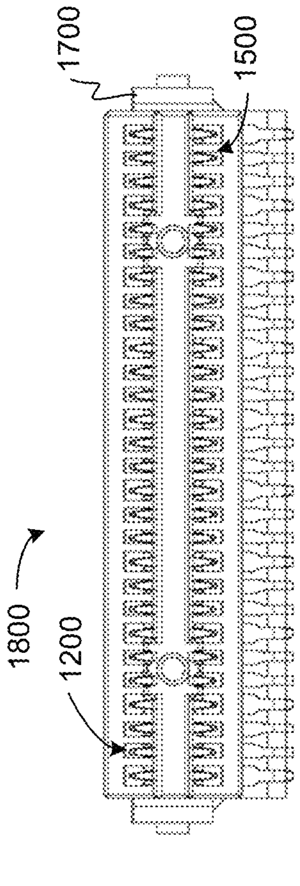
FIG. 18B is a front view of the sub-assembly including a spacer of FIGS. 17A-E, the top row of conductors with the overmolding of FIGS. 13A-E, the bottom row of conductors with the overmolding of FIG. 16A-E, according to some embodiments.
Figure 18C:
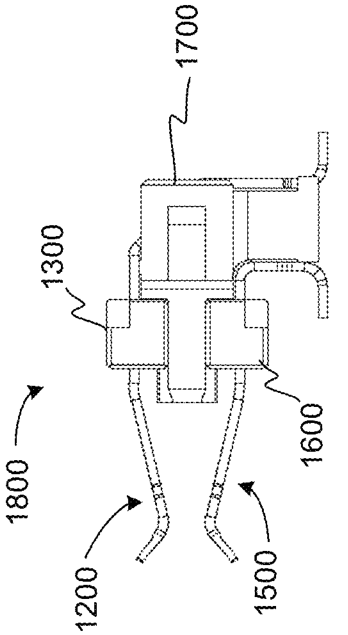
FIG. 18C is a side view of the sub-assembly including a spacer of FIGS. 17A-E, the top row of conductors with the overmolding of FIGS. 13A-E, the bottom row of conductors with the overmolding of FIG. 16A-E, according to some embodiments.
Figure 18D:
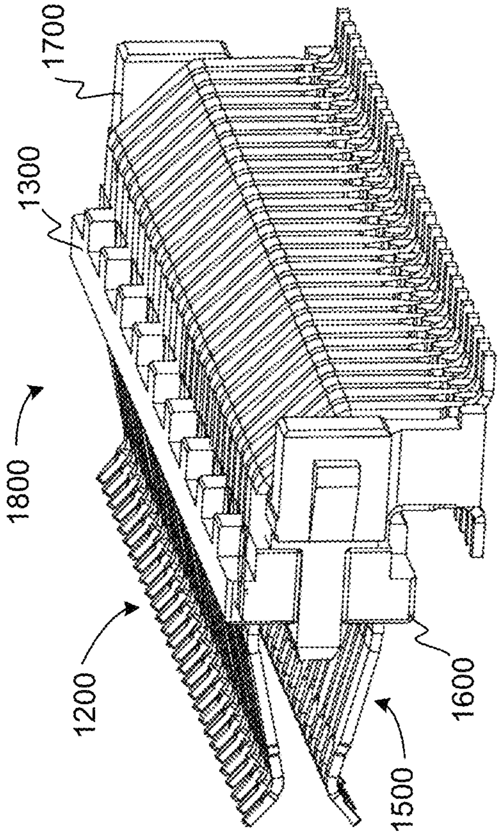
FIG. 18D is a perspective view of the sub-assembly including a spacer of FIGS. 17A-E, the top row of conductors with the overmolding of FIGS. 13A-E, the bottom row of conductors with the overmolding of FIG. 16A-E, according to some embodiments.
Figure 18E:
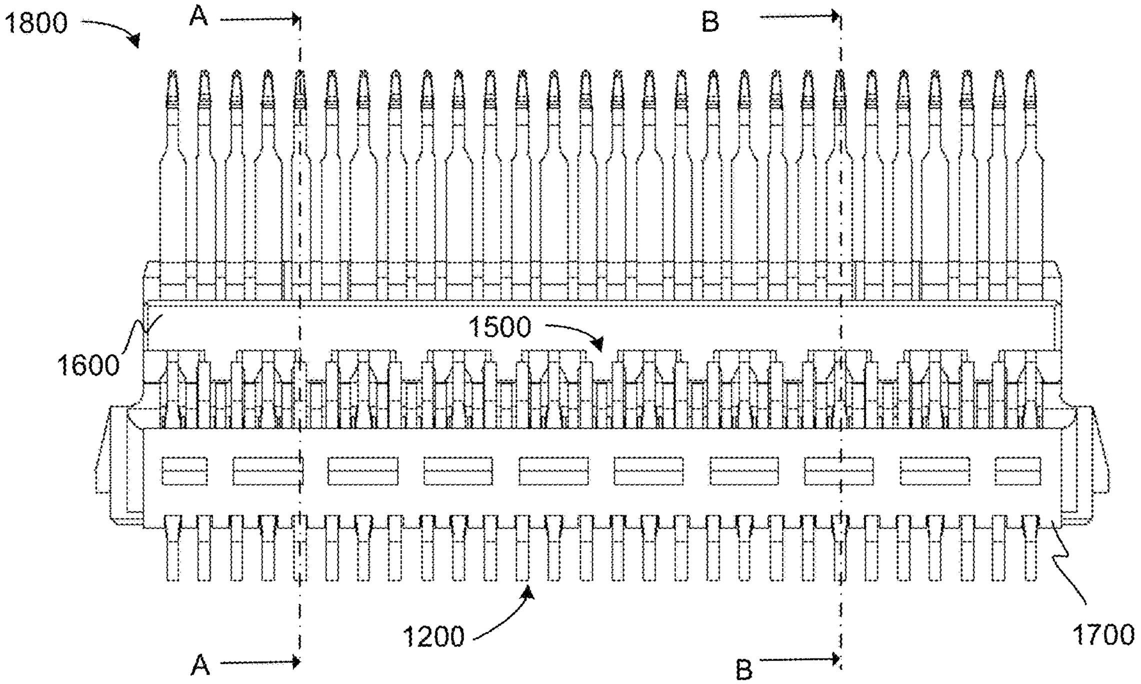
FIG. 18E is a bottom view of the sub-assembly including a spacer of FIGS. 17A-E, the top row of conductors with the overmolding of FIGS. 13A-E, the bottom row of conductors with the overmolding of FIG. 16A-E, according to some embodiments.
Figure 18F:
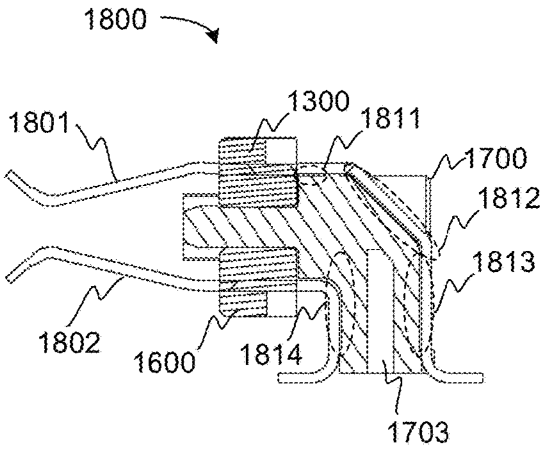
FIG. 18F is a cross-sectional view of the sub-assembly including a spacer of FIGS. 17A-E, the top row of conductors with the overmolding of FIGS. 13A-E, the bottom row of conductors with the overmolding of FIG. 16A-E, according to some embodiments. The cross-section is defined by the plane A-A shown in FIG. 18E.
Figure 18G:
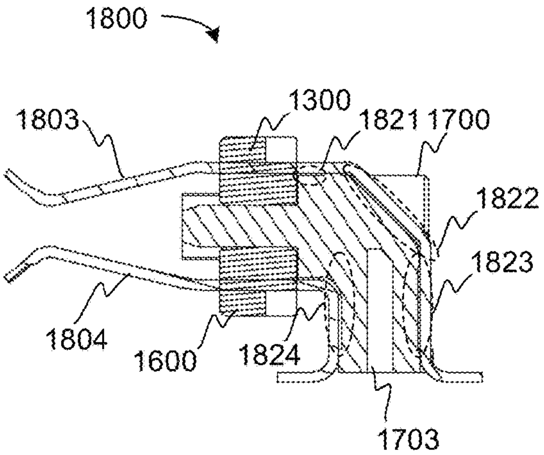
FIG. 18G is a cross-sectional view of the sub-assembly including a spacer of FIGS. 17A-E, the top row of conductors with the overmolding of FIGS. 13A-E, the bottom row of conductors with the overmolding of FIG. 16A-E, according to some embodiments. The cross-section is defined by the plane B-B shown in FIG. 18E.

In some embodiments, the top row of conductors 1200 with overmolding 1300 and the bottom row of conductors 1500 with overmolding 1600, may be assembled together with the spacer 1700 separating the two rows. FIG. 18A is a top view of a sub-assembly 1800 including a spacer of 1700, the top row 1200 of conductors with the overmolding 1300, the bottom row 1500 of conductors with the overmolding 1600, according to some embodiments. FIG. 18B is a front view of the sub-assembly 1800 including a spacer of 1700, the top row 1200 of conductors with the overmolding 1300, the bottom row 1500 of conductors with the overmolding 1600, according to some embodiments. FIG. 18C is a side view of the sub-assembly 1800 including a spacer of 1700, the top row 1200 of conductors with the overmolding 1300, the bottom row 1500 of conductors with the overmolding 1600, according to some embodiments. FIG. 18D is a perspective view of the sub-assembly 1800 including a spacer of 1700, the top row 1200 of conductors with the overmolding 1300, the bottom row 1500 of conductors with the overmolding 1600, according to some embodiments. FIG. 18E is a bottom view of the sub-assembly 1800 including a spacer of 1700, the top row 1200 of conductors with the overmolding 1300, the bottom row 1500 of conductors with the overmolding 1600, according to some embodiments. FIG. 18F is a cross-sectional view of the sub-assembly 1800 including a spacer of 1700, the top row 1200 of conductors with the overmolding 1300, the bottom row 1500 of conductors with the overmolding 1600, according to some embodiments. The cross-section of FIG. 18F is defined by the plane A-A shown in FIG. 18E. FIG. 18G is a cross-sectional view of the sub-assembly 1800 including a spacer of 1700, the top row 1200 of conductors with the overmolding 1300, the bottom row 1500 of conductors with the overmolding 1600, according to some embodiments. The cross-section of FIG. 18G is defined by the plane B-B shown in FIG. 18E.

As is shown in FIG. 18F, which illustrates a cross-section through a signal conductor 1801 of the top row 1200 and signal conductor 1802 of row 1500, protrusions 1720 and 1722 create air gaps 1811-1813 between the signal conductor 801 and the spacer 1700 and an air gap 1814 between the signal conductor 1802 and the spacer 1700. In some embodiments, air gaps 1811-1814 may be less than 0.5 mm and greater than 0.01 mm, less than 0.4 mm and greater than 0.01 mm, less than 0.3 mm and greater than 0.01 mm, or less than 0.2 mm and greater than 0.01 mm. In some embodiments, the air gaps 1811-1814 reduce the crosstalk resonances between conductors.

As is shown in FIG. 18G, which illustrates a cross-section through a ground conductor 1803 of the top row 1200 and a ground conductor 1804 of the bottom row 1500, protrusions 1720 and 1722 create air gaps 1821-1823 between the ground conductor 1803 and the spacer 1700 and an air gap 1814 between the ground conductor 804 and the spacer 1700. In some embodiments, air gaps 1821-1824 are equal to the air gaps 1811-1824. For example, the air gaps 1821-1824 may be less than 0.5 mm and greater than 0.01 mm, less than 0.4 mm and greater than 0.01 mm, less than 0.3 mm and greater than 0.01 mm, or less than 0.2 mm and greater than 0.01 mm. In some embodiments, the air gaps 1813 and 1814 reduce the crosstalk resonances between conductors.

Further shown in FIGS. 18F and 18G, the openings 1703 formed in the spacer 1700 can affect the electrical properties of the conductors and, in some embodiments, reduce crosstalk.

Figure 19C:
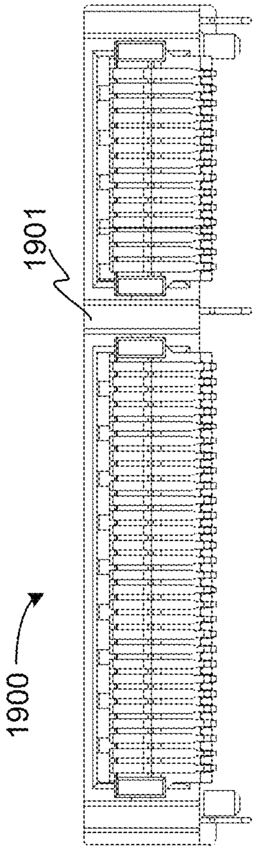
FIG. 19C is a bottom view of the right-angle connector of FIG. 2, according to some embodiments.
Figure 19A:
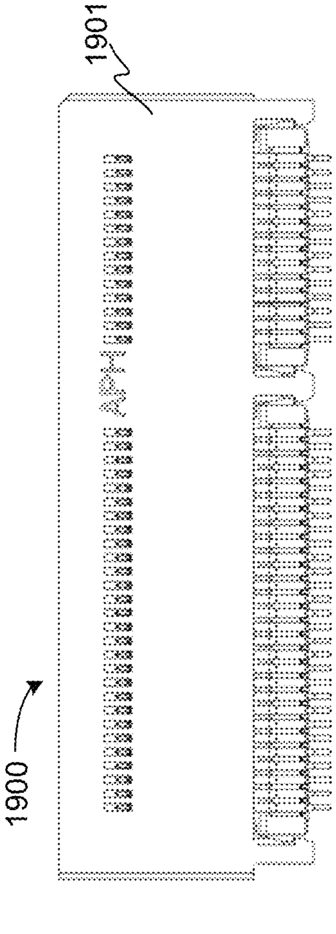
FIG. 19A is a top view of a right-angle connector of FIG. 2, according to some embodiments.
Figure 19D:
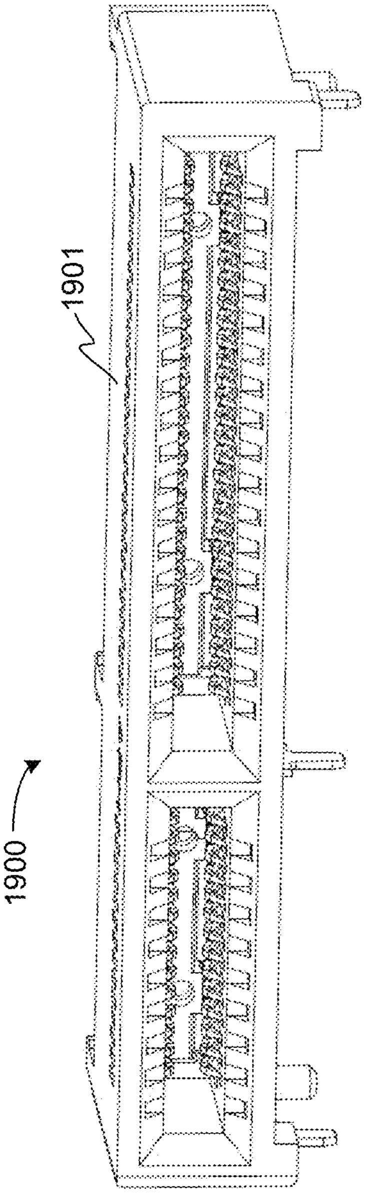
FIG. 19D is a perspective view of right-angle connector of FIG. 2, according to some embodiments.
Figure 19B:
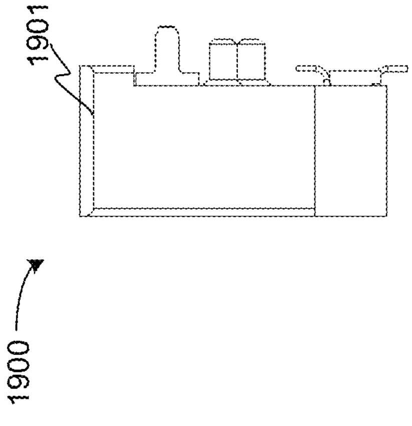
FIG. 19B is a side view of the right-angle connector of FIG. 2, according to some embodiments.
Figure 19E:
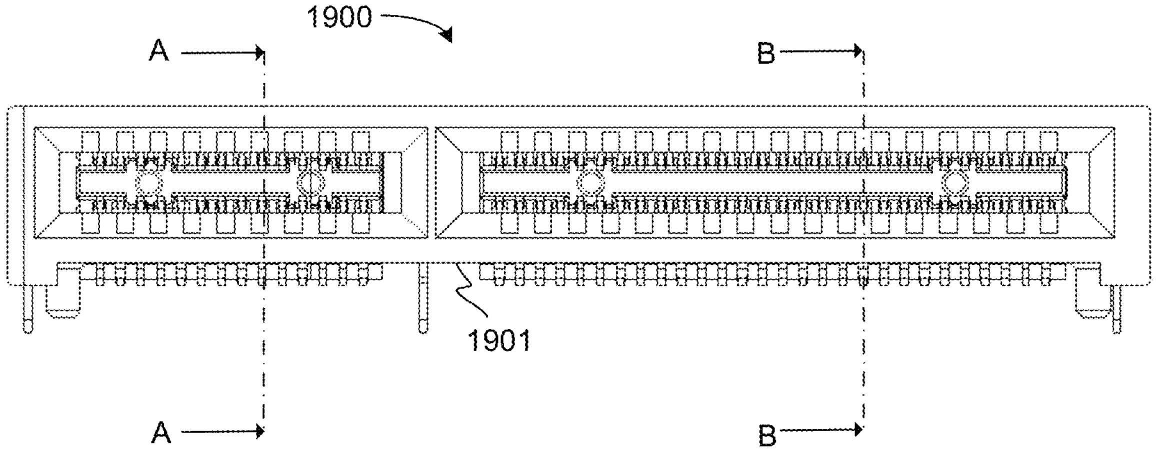
FIG. 19E is a front view of right-angle connector of FIG. 2, according to some embodiments.
Figure 19F:
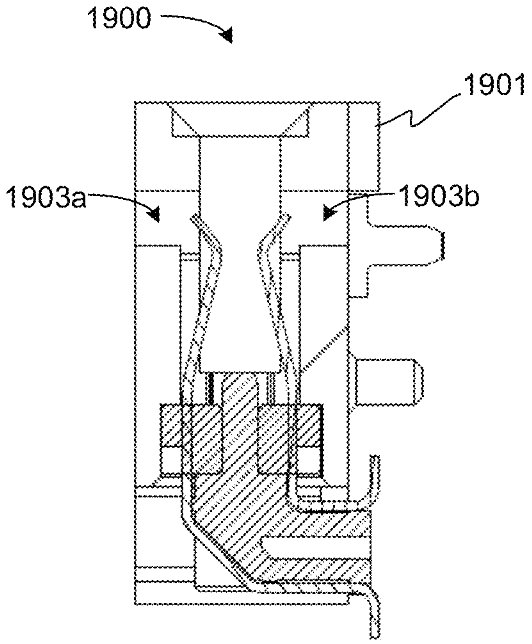
FIG. 19F is a cross-sectional view of right-angle connector of FIG. 2, according to some embodiments. The cross-section is defined by the plane A-A shown in FIG. 19E.
Figure 19G:
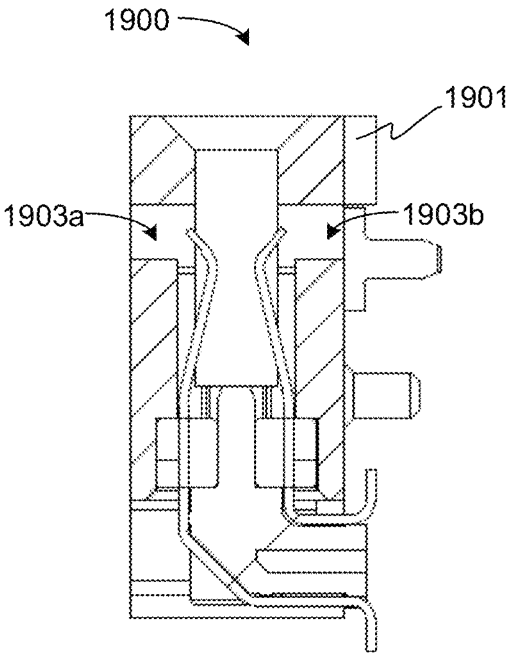
FIG. 19G is a cross-sectional view of the right-angle connector of FIG. 2, according to some embodiments. The cross-section is defined relative to the plane B-B shown in FIG. 19E.

In some embodiments, the sub-assembly 1800 may be housed within a housing formed from an insulating material. FIG. 19A is a top view of a vertical connector 1900 with 84 conductors, according to some embodiments. FIG. 19B is a side view of the vertical connector 1900, according to some embodiments. FIG. 19C is a bottom view of the vertical connector 1900, according to some embodiments. FIG. 19D is a perspective view of vertical connector 1900, according to some embodiments. FIG. 19E is a front view of vertical connector 1900, according to some embodiments. FIG. 19F is a cross-sectional view of vertical connector 1900, according to some embodiments. The cross-section of FIG. 19F is defined by the plane A-A shown in FIG. 19E. FIG. 19G is a cross-sectional view of vertical connector 1900, according to some embodiments. The cross-section of FIG. 19G is defined relative to the plane B-B shown in FIG. 19E.

The right-angle connector 1900 includes a housing 1901, which includes at least one opening 1905 that is configured to receive a PCB. In some embodiments, the opening 1905 may include a slot that is bounded by a first wall of the housing and a second wall of the housing. The conductors may be aligned in rows along the first wall and the second wall of the housing.

The contact portion of the conductors are exposed within the at least one opening 1905. The housing 1901 includes channels 1903*a* and 1903*b* that are configured to receive the tip portion of a respective conductor. When a PCB is inserted into the right-angle connector 1900, a conductive portion of the PCB is placed in contact with a respective conductor. The PCB spreads the two rows of conductors apart, moving the tip portion of each conductor into the channels 903*a* and 903*b*. In some embodiments, the tail portions of the conductors extend from the housing 1901. This may be useful, for example, for connecting the conductors to a PCB on which the right-angle connector 1900 is mounted.

The air gaps 1811-1814 and 1821-1824 are shown in FIGS. 19F and 19G, but are not labelled for the sake of clarity.

Referring to FIGS. 20A-D, four example plots illustrate crosstalk as a function of signal frequency for a variety of connector configurations. FIG. 20A compares a plot 2001 of the power-summed near end crosstalk (NEXT) for a first pair of conductors in an electrical connector with no gap between the spacer and the conductors with a plot 2002 of the power-summed NEXT for the same first pair of conductors in an electrical connector with a 0.05 mm gap between the spacer and the conductors. FIG. 20B compares a plot 2011 of the power-summed far end crosstalk (FEXT) for a first pair of conductors in the electrical connector with no gap between the spacer and the conductors with a plot 2012 of the power-summed FEXT for the same first pair of conductors in the electrical connector with a 0.05 mm gap between the spacer and the conductors. FIG. 20C compares a plot 2021 of the power-summed NEXT for a second pair of conductors in the electrical connector with no gap between the spacer and the conductors with a plot 2022 of the power-summed NEXT for the same second pair of conductors in an electrical connector with a 0.05 mm gap between the spacer and the conductors. FIG. 20D compares a plot 2031 of the power-summed FEXT for a second pair of conductors in the electrical connector with no gap between the spacer and the conductors with a plot 2032 of the power-summed FEXT for the same second pair of conductors in an electrical connector with a 0.05 mm gap between the spacer and the conductors.

As illustrated by FIGS. 20A-D, crosstalk may be reduced over a broad range of frequencies by including a gap between the spacer and the conductors of an electrical connector. Additionally, resonances that appear in the electrical connector without a gap may be significantly reduced (e.g., a decrease of more than 2 dB) by including a gap between the spacer and the conductors. Furthermore, the electrical connector with a 0.05 mm gap meets the targeted PCIe Gen 5 specification (illustrated in FIGS. 20A-D as line 2003) for a broad range of frequencies.

Having thus described several aspects of at least one embodiment of this invention, it is to be appreciated that various alterations, modifications, and improvements will readily occur to those skilled in the art.

For example, it is described that an opening is formed in a spacer of an electrical connector near a ground conductor such that the ground conductor is exposed to air. Alternatively or additionally, the opening may be formed near other portions of the conductors. For example, the opening may be formed between a ground conductor and one of the signal conductors such that both a portion of the ground conductor and a portion of a signal conductor is exposed to air.

As an example of another variation, it is described that openings in an overmolding and/or slots in a spacer and/or housing exposes the one or more portions of one or more conductors to air. Air has a low dielectric constant relative to an insulating material used to form overmoldings, spacers and housings. The relative dielectric constant of air, for example, may be about 1.0, which contrasts to a dielectric housing with a relative dielectric constant in the range of about 2.4 to 4.0. The improved performance described herein may be achieved with a openings filled with material other than air, if the relative dielectric constant of that material is low, such as between 1.0 and 2.0 or between 1.0 and 1.5, in some embodiments.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

As used herein in the specification and in the claims, the phrase “equal” or “the same” in reference to two values (e.g., distances, widths, etc.) means that two values are the same within manufacturing tolerances. Thus, two values being equal, or the same, may mean that the two values are different from one another by ±5%.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electrical connector comprising:

an insulative housing comprising a slot bound by a first wall and a second wall of the insulative housing;

a plurality of conductors, disposed within the slot, arranged in a first row of the plurality of conductors along the first wall of the insulative housing and a second row of the plurality of conductors along the second wall of the insulative housing, each of the plurality of conductors comprising a tip portion, a tail portion, a contact portion disposed between the tail portion and the tip portion, and a body portion disposed between the tail portion and the contact portion;

a first overmolding in physical contact with ones of the plurality of conductors in the first row; and a second overmolding in physical contact with ones of the plurality of conductors in the second row, wherein:

the insulative housing comprises a plurality of channels that extend through the first and second walls of the insulative housing; and the tip portions of the plurality of conductors extend into the channels.

2. The electrical connector of claim 1, wherein the body portions of the plurality of conductors have a first thickness and the tip portions of the plurality of connectors have a second thickness less than the first thickness.

3. The electrical connector of claim 2, wherein the tip portions are coined.

4. The electrical connector of claim 1, wherein the plurality of conductors comprises a plurality of groups of three conductors, wherein each group of three conductors comprises:

a ground conductor having a first shape;

a first signal conductor having a second shape different from the first shape; and a second signal conductor having a third shape different from the first shape.

5. The electrical connector of claim 4, wherein the second shape is a mirror image of the third shape.

6. The electrical connector of claim 4, wherein:

each of the plurality of groups of three conductors are positioned such that a distal end of the tip portion of the ground conductor is a first distance from a distal end of the tip portion of the first signal conductor and a distal end of the tip portion of the first signal conductor is a second distance from a distal end of the tip portion of the second signal conductor, wherein the first distance is equal to the second distance; and each of the plurality of groups of three conductors are positioned such that the contact portion of the ground conductor is a third distance from the contact portion of the first signal conductor and the contact portion of the first signal conductor is a fourth distance from the contact portion of the second signal conductor, wherein the third distance is equal to the fourth distance.

7. The electrical connector of claim 4, wherein the plurality of conductors comprise a first region in which:

the body portions of the first conductor and the second conductor of each group of the plurality of groups have a same first width;

the ground conductor of the group has a second width, greater than the first width, and edge-to-edge separation between the first conductor and the second conductor and between the second conductor and the ground conductor is the same.

8. The electrical connector of claim 4, wherein the body portions of the conductors comprise a wide portion and a thin portion.

9. The electrical connector of claim 8, wherein the body portions of the conductors comprise tapered portions between the wide and thin portions.

10. The electrical connector of claim 9, wherein the tapered portions of the first and second signal conductors comprise first tapered portions on first sides of the first and second signal conductors and second tapered portions on second sides of the first and second signal conductors, and one of the first or second tapered portions is more tapered than the other.

11. The electrical connector of claim 4, wherein:

the first overmolding is in physical contact with a thin portion of the body portion of each of the plurality of conductors in the first row; and the first overmolding comprises one or more openings that expose portions of the plurality of conductors in the first row to air.

12. The electrical connector of claim 11, wherein:

the one or more openings expose the ground conductors of the plurality of conductors in the first row to air at a first location along the length of the ground conductors without exposing the first signal conductors or the second signal conductors to air at a second location along the length of the first signal conductors and second signal conductors that corresponds to the first location.

13. The electrical connector of claim 11, wherein:

the one or more openings expose two conductors of the groups of three conductors of the plurality of conductors in the first row to air at a first location along the length of the ground conductors without exposing the remaining signal conductors to air at a second location along the length of the remaining signal conductors that corresponds to the first location.

14. The electrical connector of claim 1, wherein the first overmolding and the second overmolding comprise one or more protrusions which protrude from the overmolding in a direction perpendicular to a direction in which the respective first row or second row is aligned.

15. The electrical connector of claim 14, wherein each of the plurality of conductors in the first row is opposed by a respective conductor of the plurality of conductors in the second row.

16. The electrical connector of claim 15, wherein the protrusions of the first and second overmoldings are configured to be inserted into one or more grooves such that, when the first and second overmolding are assembled, each of the plurality of conductors in the first row is opposed by a respective conductor of the plurality of conductors in the second row.

17. The electrical connector of claim 16, wherein the first and second overmolding are assembled with a spacer, comprising the one or more grooves, in between the first and second overmoldings.

18. The electrical connector of claim 17, wherein the spacer comprises one or more spacer openings configured to create air gaps between the spacer and conductors.

19. The electrical connector of claim 17, wherein the spacer comprises one or more ribs configured to hold conductors of the plurality of conductors in place relative to each other and relative to the spacer.

20. The electrical connector of claim 1 further comprising:

a second slot bound by the first and second walls of the housing;

a second plurality of conductors disposed within the second slot, wherein the second plurality of conductors includes fewer conductors than the plurality of conductors.

* * * * *